US009727775B2

United States Patent
Ryu et al.

(10) Patent No.: US 9,727,775 B2
(45) Date of Patent: Aug. 8, 2017

(54) METHOD AND SYSTEM OF CURVED OBJECT RECOGNITION USING IMAGE MATCHING FOR IMAGE PROCESSING

(71) Applicant: INTEL CORPORATION, Santa Clara, CA (US)

(72) Inventors: Wooju Ryu, Seoul (KR); Tae-Hoon Kim, Seoul (KR); Minje Park, Seoul (KR); Boogeon Yoon, Seoul (KR); Jinwook Lee, Seoul (KR)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/956,249

(22) Filed: Dec. 1, 2015

(65) Prior Publication Data

US 2017/0154204 A1 Jun. 1, 2017

(51) Int. Cl.
G06K 9/00 (2006.01)
G06K 9/46 (2006.01)
G06K 9/48 (2006.01)
G06T 7/00 (2017.01)
G06T 1/20 (2006.01)

(52) U.S. Cl.
CPC ..... G06K 9/00208 (2013.01); G06K 9/00214 (2013.01); G06K 9/4604 (2013.01); G06K 9/4676 (2013.01); G06K 9/481 (2013.01); G06T 1/20 (2013.01); G06T 7/0061 (2013.01)

(58) Field of Classification Search
CPC .. G06F 17/18; G06F 17/30247; G06K 9/4671

USPC .......................................................... 382/154
See application file for complete search history.

(56) References Cited

U.S. PATENT DOCUMENTS 6,421,051 B1   7/2002  Kato
2013/0039566 A1*  2/2013  Reznick .................. G06T 9/005
                                                                    382/154

OTHER PUBLICATIONS

Kang et al., "Image Matching With Distinctive Visual Vocabulary", Applications of Computer Vision (WACV), 2011 IEEE Workshop on, pp. 402-409.
Chum et al., "Matching with PROSAC—Progressive Sample Consensus", 2005 IEEE Computer Society Conference on Computer Vision and Pattern Recognition (CVPR'05), 7 pages.
Sivic et al., "Video Google: A Text Retrieval Approach to Object Matching in Videos", Proceedings of the Ninth IEEE International Conference on Computer Vision (ICCV 2003), 8 pages.
Nister, et al., "Scalable Recognition with a Vocabulary Tree", Proceedings of the 2006 IEEE Computer Society Conference on Computer Vision and Pattern Recognition (CVPR'06), 8 pages.
Kottman, Michal, "Planar Object Detection using Local Feature Descriptors", Information Sciences and Technologies Bulletin of the ACM Slovakia, Special Section on Student Research in Informatics and Information Technologies, vol. 3, No. 2 (2011) 59-63.

* cited by examiner

*Primary Examiner* — Manuchehr Rahmjoo
(74) *Attorney, Agent, or Firm* — Green, Howard & Mughal LLP

(57) ABSTRACT

A system, article, and method of curved object recognition using image matching for image processing.

22 Claims, 11 Drawing Sheets

FIG. 1

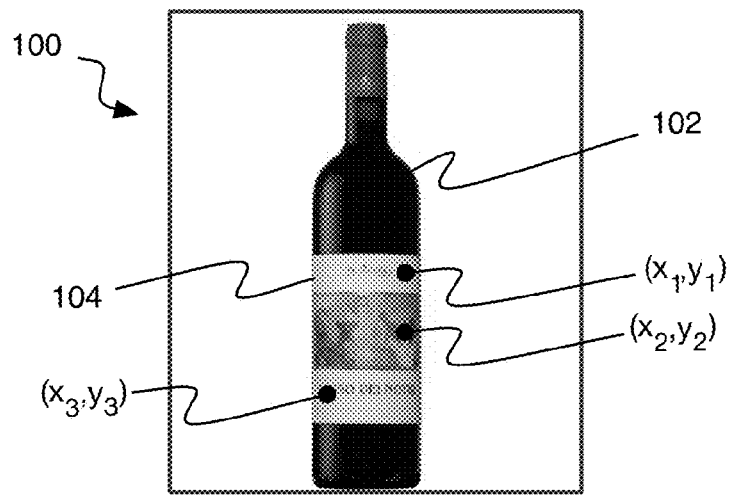

OBAIN IMAGE DATA OF AT LEAST ONE REFERENCE IMAGE HAVING AT LEAST ONE CURVED REFERENCE OBJECT AND FROM A PLURALITY OF REFERENCE IMAGES EACH WITH AT LEAST ONE REFERENCE OBJECT, AND WHEREIN THE IMAGE DATA COMPRISES AT LEAST THREE-DIMENSIONAL COORDINATES OF THREE DIMENSIONAL (3D) POINTS ON THE AT LEAST ONE CURVED REFERENCE OBJECT 202

OBTAIN TWO-DIMENSIONAL (2D) IMAGE DATA OF A CURVED TARGET OBJECT IN A QUERY IMAGE 204

MATCH THE TARGET OBJECT TO AT LEAST ONE OF THE REFERENCE OBJECTS COMPRISING PAIRING AT LEAST ONE 2D POINT FROM THE TARGET OBJECT WITH A CORRESPONDING 3D POINT ON AT LEAST ONE OF THE REFERENCE OBJECTS 206

USE THE 2D-3D PAIRED POINT(S) TO FORM A PERSPECTIVE PROJECTION FUNCTION TO DETERMINE A GEOMETRIC CORRESPONDENCE BETWEEN THE TARGET OBJECT AND REFERENCE OBJECT(S) AND THAT CONVERTS THE 2D POINTS TO 3D POINTS AT THE TARGET OBJECT 208

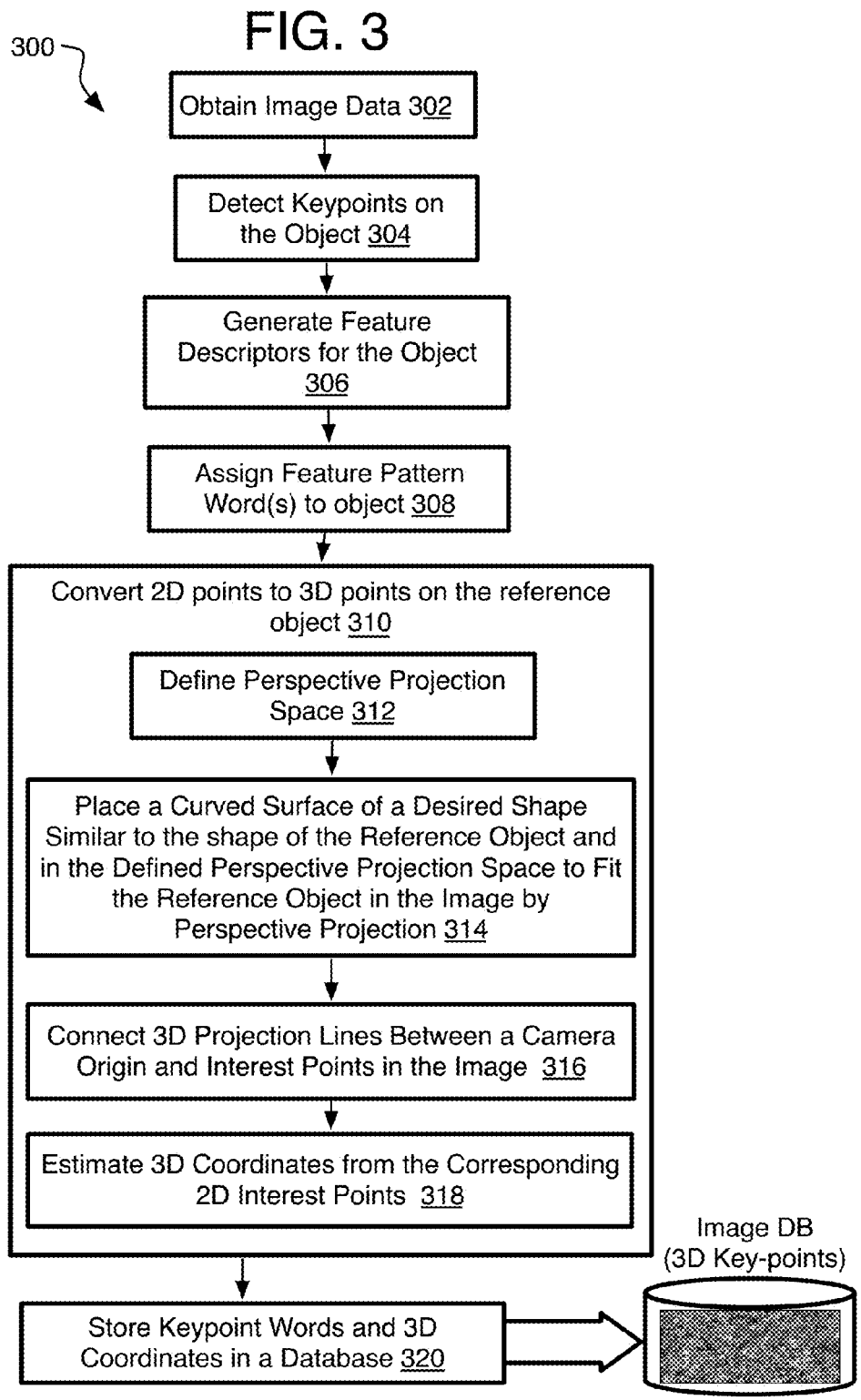

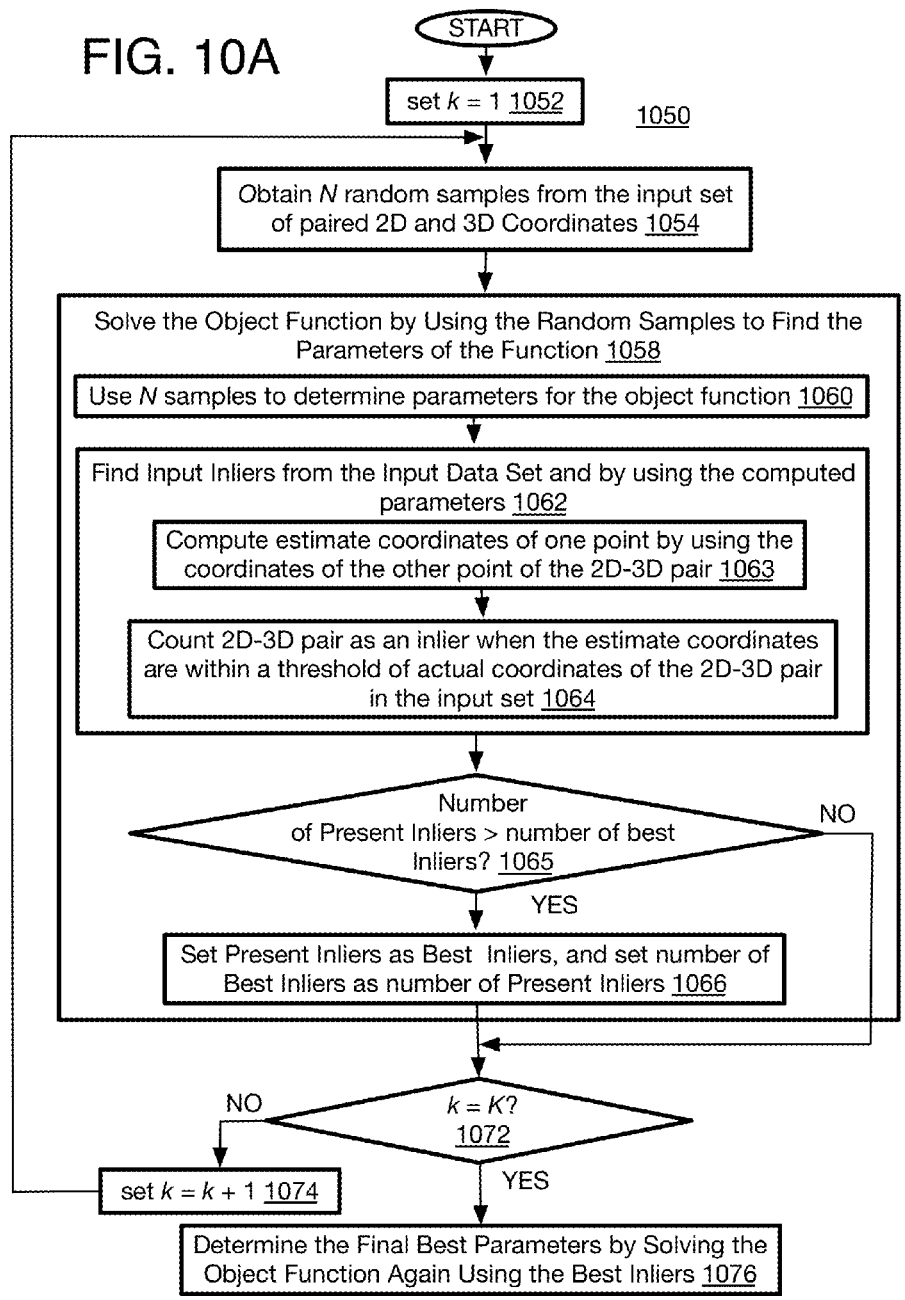

METHOD AND SYSTEM OF CURVED OBJECT RECOGNITION USING IMAGE MATCHING FOR IMAGE PROCESSING

BACKGROUND

Object recognition includes detecting and identifying objects in an image. This is used in computer vision so that actions can be performed by a computer depending on the identity of the observed object from an image and without the assistance from a person to identify the object for example. Otherwise, object detection may be used to identify an object that is to be moved within the image whether for practical reasons such as work place presentations or products, or for entertainment purposes. Also, once the objects are identified, it is often useful to augment the object in an image by placing external virtual objects onto the detected object in the scene. When performed correctly, the virtual objects are placed on the object in a realistic perspective that matches the perspective in the image so that the scene with the inserted objects looks realistic to a person viewing the image. In order to perform many of these functions, the three-dimensional position and dimensions of the object in the image are usually needed.

While object recognition and/or augmentation of objects with planar surfaces is well developed, detection and recognition, and in turn, augmentation, of curved objects in an image is still inadequate. Thus, for example, there is still great difficulty in accurately recognizing a cylindrical object in an image, such as a bottle, due to poor depth mapping of curved objects.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is an illustration of a curved object in an image that is to be detected and recognized for image processing;

FIG. 2 is a flow chart showing a method of curved object recognition in accordance with the implementations herein;

FIG. 3 is a detailed flow chart of a method to establish a database of image data for use in the curved object recognition process in accordance with the implementations herein;

FIG. 10A is a detailed flow chart of for operation used by the method of curved object recognition in accordance with the process of FIG. 8;

DETAILED DESCRIPTION

Figure 4:
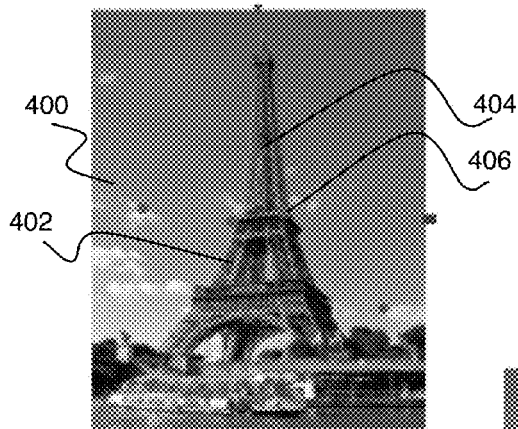
FIG. 4 is an image for showing keypoint detection for the method of curved object recognition in accordance with the implementations herein.

One or more implementations are now described with reference to the enclosed figures. While specific configurations and arrangements are discussed, it should be understood that this is performed for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video game panels or consoles, set top boxes, tablets, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of curved object recognition using image matching for image processing.

As mentioned, object recognition performed to identify planar or near-planar objects is known. These conventional techniques may attempt to match an object in an image to a 2D image in a database or library. These conventional techniques cannot achieve the accuracy by using 3D coordinates. This becomes especially difficult when images only provide the 2D information rather than any 3D depth map.

Most conventional image matching algorithms assume that a target object is nearly planar such as a book-cover or art painting. Thus, for images that only have 2D data, this assumption limits the use-case of the algorithm to planar or near-planar objects since it cannot recognize common curved objects such as labels on a bottle. This results in computer vision that cannot recognize curved objects from 2D images, limited object modification since the object cannot be moved in three dimensions, or limited augmentation since any virtual object placed on the identified object must match the given 2D perspective rather than being placed with benefit of accurate 3D coordinates of the curved object.

To resolve these issues and provide object recognition that is not so limited by the shape of the target object to be detected, the present method and system recognizes at least curved shapes such as at least cylindrical shapes by checking the consistency of 3D transformations instead of the strict 2D homography. This is accomplished first by establishing a database of reference images of curved reference objects that are stored with 3D geometric information. This is performed by using a virtual shape or surface (such as a cylinder) that is close in shape to a reference object (such as a bottle) and in perspective projection to project the 3D geometry of the virtual surface to the reference object. Then, during object recognition, the candidate reference objects of the image database are fitted to the target objects to be recognized in the target image by determining geometric similarity between the target object and reference object data of at least one reference image using image texture-level similarity and 3D homography matching or transformations. By one example, the texture-level similarity is performed by comparing words from a bag of words (BoW) technique, and the 2D to 3D transformation may be performed by using a perspective projection function for the objects being compared and that uses rotation and translation matrices in the equation and with parameters determined by a parametric technique (such as Random Sample Consensus (RANSAC) by one possible example) and is explained in greater detail below.

Referring to FIG. 1, an image 100 provides an example curved target object 102 such as a bottle with a label 104, and specifically here a wine bottle, The image, and in turn the object, may be formed by pixel data such as chroma or luminance pixel data where the pixels are at least located on the image by 2D coordinates such as (x1, y1), (x2, y2) and (x3, y3), and so forth, as shown. It may be desirable for a computer application to identify the target object as a bottle, or wine bottle, or even specific type of wine bottle by the shape of the bottle or by the printing or design on the label 104. Alternatively or additionally, it may be desirable to identify the bottle to modify the image by moving the bottle by translating or rotating the bottle in a scene in the image, or by placing a different curved label 104 or other virtual objects on the wine bottle for example. This may be accomplished using the operations herein to at least recognize the bottle and/or the label. The target object 102 of image 100 of FIG. 1, here a bottle, as well as other images showing different objects are used herein to provide examples below.

It will be appreciate that while the objects being discussed herein are mainly cylinders, the curved object recognition process could work equally well for other curved surfaces such as a portion of a cylinder (rather than an entire circumference of the cylinder) or other irregular curved open or closed shapes, as long as a virtual object of the same or similar shape and known 3D coordinates can be developed for perspective projection or other 2D to 3D coordinate conversion for reference images.

Referring to FIG. 2, process 200 is provided for a method and system of curved object recognition using image matching for image processing. In the illustrated implementation, process 200 may include one or more operations, functions or actions 202 to 208 numbered evenly. By way of non-limiting example, process 200 may be described herein with reference to example image capture processing system 1200 of FIG. 12, and where relevant.

Process 200 may include "obtain image data of at least one reference image having at least one curved reference object and from a plurality of reference images each with at least one reference object, and wherein the image data comprises at least three-dimensional coordinates of three-dimensional (3D) points on the at least one curved reference object" 202. As explained in greater detail below, the image data may be provided in the form of a database of reference images with reference objects. The reference images initially may be provided in 2D (with 2D (u, v) coordinates) for each pixel (or a sampling of the pixels). A perspective projection technique then may be used by projecting coordinates of a virtual 3D object to the reference object to determine 3D coordinates for the 2D points on the reference object. The 3D coordinates of the points for the reference images may be stored in the database. The details are explained below.

Process 200 may include "obtain two-dimensional (2D) image data of a curved target object in a query image" 204. Thus, either automatically or manually by a user, a query image showing a target object may be presented for recognition and matching to reference objects in the reference database. The target object also may provide 2D coordinates without a depth map for example.

Process 200 may include "match the target object to at least one of the reference objects comprising pairing at least one 2D point from the target object with a corresponding 3D point on at least one of the reference objects" 206. As explained in detail below, this may include a number of operations including preliminary operations to detect keypoints in the images, define feature descriptors (or feature vectors), and then by using the feature vectors in a bag of words (BoW) algorithm to assign words to each 2D point and 3D point on the query and reference images. Candidate reference images can be selected among those reference images with a similar word pattern as that on a target object of a query image. The 2D points and 3D points then can be matched depending on which reference object(s) has the same words as on the target object and/or other factors relating to the words described below.

Process 200 may include "use the paired 2D-3D point(s) to form a perspective projection function to determine a geometric correspondence between the target object and reference object(s) and that converts the 2D points into 3D points at the target object" 208. Particularly, a sampling of the 2D-3D pairs from the target object and one or more reference objects from candidate reference images are inputted to a perspective projection function or equation to determine the parameters of the equation. The parameters indicate a transition in position from the reference object to the target object and may be used to set the 3D coordinates of the 2D points on the target object. Once a set of 2D-3D pairs from an input set are inputted to the equation, the resulting parameters are maintained, and it is determined how many other 2D-3D pairs (inliers) are satisfied by those same parameters and in the equation. This analysis may be repeated for a number of iterations where each iteration may use 2D-3D pairs selected randomly from an input set and from the same target object and one or more candidate reference objects. The 3D points from the reference objects may be treated as a group such that the equation does not need to treat each candidate reference image separately. Thus, the 3D points, and in turn the 2D-3D pairs, are tested in the equation by any convenient or efficient order and need not be reference image by reference image. The computations are performed by using a parameterization technique such as RANSAC or others. The parameters that satisfy the most 2D-3D pairs (inliers) in the equation is considered the final parameters for the equation and then can be used to convert any 2D point on the target object to 3D coordinates. Again, the details are explained below.

As mentioned, as a preliminary or pre-processing operation for the object recognition process, an image database may be established that holds reference images of 3D geometry of reference objects. The 3D geometry to be stored in the database may be obtained as follows.

Referring to FIG. 3, process 300 is provided for a method and system of curved object recognition using image matching for image processing. In the illustrated implementation, process 300 may include one or more operations, functions or actions 302 to 320 numbered evenly. By way of non-limiting example, process 300 may be described herein with reference to example image capture processing system 1200 of FIG. 12, and where relevant.

Process 300 may include "obtain image data" 302, and particularly to obtain the image data of one or more images, and may be one or more still pictures or one or more frames for a video sequence. This may include pre-processing raw image data and could include demosaicing, noise reduction, pixel linearization, shading compensation, resolution reduction, vignette elimination, and/or 3A related operations including automatic white balance (AWB), automatic focus (AF), and/or automatic exposure (AE) modifications, and so forth. The results may be 2D (u, v) image data including pixel chroma or luminance (or grayscale) values or both, and so forth, but here at least that which is the basis for the keypoint (also referred to interchangeably as an interest point) analysis for object recognition used herein and as described below. By one option, the image data could provide 3D depth maps but, at least in one form, the methods and systems of object recognition used herein mainly apply to the use of 2D image data, whether or not such depth maps are present, as the basis of the operations until the 2D geometry of reference or target objects are converted to 3D geometry as explained herein. Thus, the present method and system may use older devices or systems or others that do not provide direct depth measurement (such as with RGBD cameras).

As to which objects (on the reference images) are to be placed into the image database, many options exist. In one example form, the database may be a general database that includes as many images of common (and/or not so common) objects as possible. There is no limit to the type and kind of objects that could be placed in the database. By this form, the database may be automatically populated and updated by programs that are seeking images to place into the database over wide area networks such as web crawling programs, and so forth. In this case, the database may be accessible to any user who has access to a certain image enhancement application that controls or has access to the database. Otherwise, either as originally taken as part of the general database, or started independently, a custom database may be formed that includes images of pictures for a specific category, such as the products of a company or a certain organization where only members of that company or organization may have access to the custom database. Continuing the wine bottle example, a wine company may have a database that includes the shapes of all of their wine bottles and/or different label configurations for example. By this alternative, the retrieval of images may be carefully controlled whether by a program that does the retrieval automatically with certain search parameters or manually entered by a user saving image files for the database. The database may be formed once and then updated continuously or by other desired timing, or the database may be created for certain projects. Many other examples exist.

Process 300 may include "detect keypoints on the object" 304, and particularly detection or feature extraction of local features that describe part of an image such as lines, curves, edges, and corners by such algorithms as Harris Corner Detector (Harris Affine) or Hessian Affine, Good Features to Track, Most Stable External Regions (MSER), Features from Accelerated Segment Test (FAST), Different of Gaussian (DoG), Laplacian of Gaussian (LoG), Determinant of Hessian (DoH) to name a few examples. For this database building process, the objects here are reference objects to be placed in the database.

Referring to FIG. 4, an image 400 with an object 402 is shown with keypoints 404 and 406. For the database building process 300, image 400 is a reference image, and object 402 is a reference object. For the database, or at least where there is an object in the image, this may result in a set of 2D (u, v) keypoint locations which have the specific properties of the given image, or more specifically, given reference object. The images may or may not have a single main object in the image. It will be noted here that the Eiffel tower is used as the object for image 400 rather than the wine bottle simply to show the variety of objects that may be used for building the database, but otherwise the preliminary operations apply equally to the wine bottle or other objects of other shapes.

Process 300 may include "generate feature descriptors for the object" 306. Specifically, a function is performed that establishes feature descriptors or feature vectors, and each feature vector has values of local feature information for one or more features, such as orientation, gradient, scale, and texture surrounding an individual keypoint. Specifically, each feature descriptor (or feature vector) is provided for a single keypoint of an object. By one form, each feature descriptor is in the form of a histogram (feature vector histogram). The feature vector histogram is built from data from surrounding points in a grid patch centered at, or otherwise around, a keypoint, and the feature descriptor may be formed for each keypoint. The contents of the feature vector histogram may be a set of concatenated sub-histograms where each different feature type has its own sub-histogram, such as intensities from an original image, gradient orientations from a gradient image including scale properties from image pyramids, edge data, line data, and so forth. The features will be stacked into the histogram from the grid patch. Thereafter, the feature descriptor may or may not be normalized (from 0 to 1) by using the maximum value of the feature descriptor so that the numbers in the feature descriptor (or feature vector) are values of each bin from the histogram feature vector. In the present case, the histogram of bin values corresponding to the gradient orientation is the feature that is used for the calculations herein. The remaining unused feature values in the feature descriptors are simply ignored. Alternatively, for the purposes of object recognition, this could be the only feature in the feature descriptors if that is desired.

Figure 5:
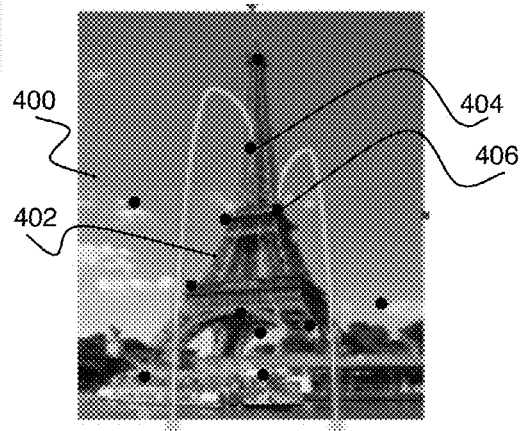
FIG. 5 is an image for showing the formation of feature descriptors for the method of curved object recognition in accordance with the implementations herein.

Referring to FIG. 5 for example, reference image 400, which is the same image as reference image 400 of FIG. 4, shows a couple of the interest points 404 and 406 but now with the data of pixels in an area or grid patch 502 or 504 (shown in close-up) respectively and around the interest point 404 or 406 respectively are converted into a feature descriptor (feature vector) 506 or 508 of features 510 or 512 respectively (here which may represent gradients, and so forth). As mentioned, the feature descriptor may be indicated as a set of numbers (which may be normalized or not) such as [0.1, 10, 3.1, . . . ] for example (with random numbers here just to show the example). Algorithms such as Speeded Up Robust Features (SURF), Scale-invariant Feature Transform (SIFT), and Histogram of Oriented Gradients (HoG) are used to form the feature descriptors. However, the present object recognition methods herein are not dependent on certain feature detection or description algorithms. Any combination of them can be used with the methods herein as long as the feature vectors for the reference object are generated.

Process 300 then may include "assign feature pattern word(s) to object" 308. A feature pattern word (or visual word also referred to as a symbol) refers to a word in a Bag of Words (BoW) technique that imitates the techniques used by internet search engines to conduct keyword searches on the internet throughout websites for example. Generally, a visual word is a letter or number that is used to index a cluster of feature descriptors (or feature vectors) in the database. Thus, the word also may be used herein to refer to the cluster of feature descriptors (or feature pattern) that the word indicates depending on the context. While a feature descriptor is a collection of features near an interest point on an image, the clusters or words are groups of feature descriptors with some feature similarity and throughout multiple (or all) reference images on the database. The collection of all clusters (or words) is called the visual vocabulary. For example, say 1,000,000 feature descriptors (or feature vectors) are collected from a large set of images captured as mentioned above. Then, these feature vectors are clustered into 1,000 clusters using well-known clustering (or vector quantization) algorithms such as K-means that clusters feature vectors with some sort of feature similarities, such as by Euclidian distance between one or more (or all) feature values in different feature vectors as one possible simplified example. Each cluster has a word, symbol, or an index number (all used interchangeably herein) and representative feature vector such as the median, mean, or other combination feature vector of a cluster. In the present operation then, each feature vector of an interest point is compared (or in other words, the similarity is determined) to many other feature vectors in the vocabulary or database representing many interest points of many objects in many different reference images for the database in order to form the clusters. Once a cluster is formed, the cluster is assigned a word (1, 2, or 3; A, B, or C, etc.; or the word could be some other mark or name) to represent that cluster. Since each cluster has a number of feature vectors (where each vectors lists values for one or more features from one or more images), each cluster may be referred to as a feature pattern cluster, and each word may be referred to as a feature pattern word. Such a BoW technique is disclosed by Kang et al., *Image Matching with Distinctive Visual Vocabulary*, Application of Computer Vision (WACV), 2011 IEEE Workshop on, pp. 402-409.

Figure 6:
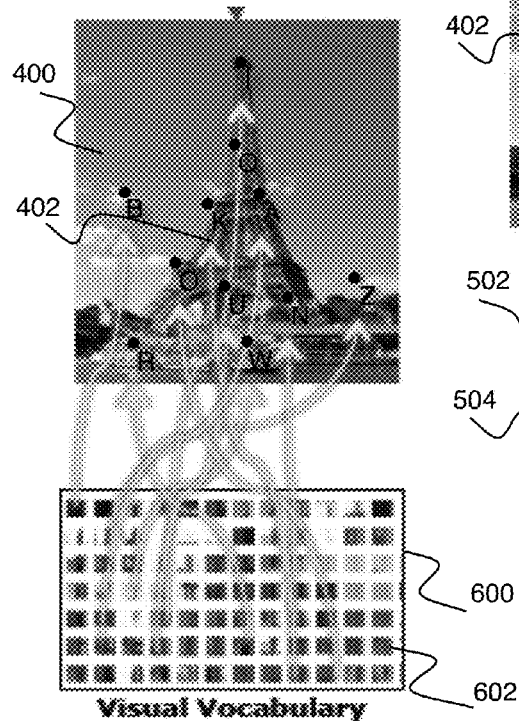
FIG. 6 is an image for showing word assignment for the method of curved object recognition in accordance with the implementations herein.

Referring to FIG. 6, here image 400 is shown with a visual vocabulary 600 which is a large group of representative images 602 that each represent a word (such that each word has similar feature vectors that depict the same or very similar part of an image albeit possibly from different reference images). Thus, as shown, this may result in individual keypoints being assigned words (here designated as A, B, I, K, N, O, Q, R, U, W or Z) in an image of which it is considered to be a part of.

Figure 7:
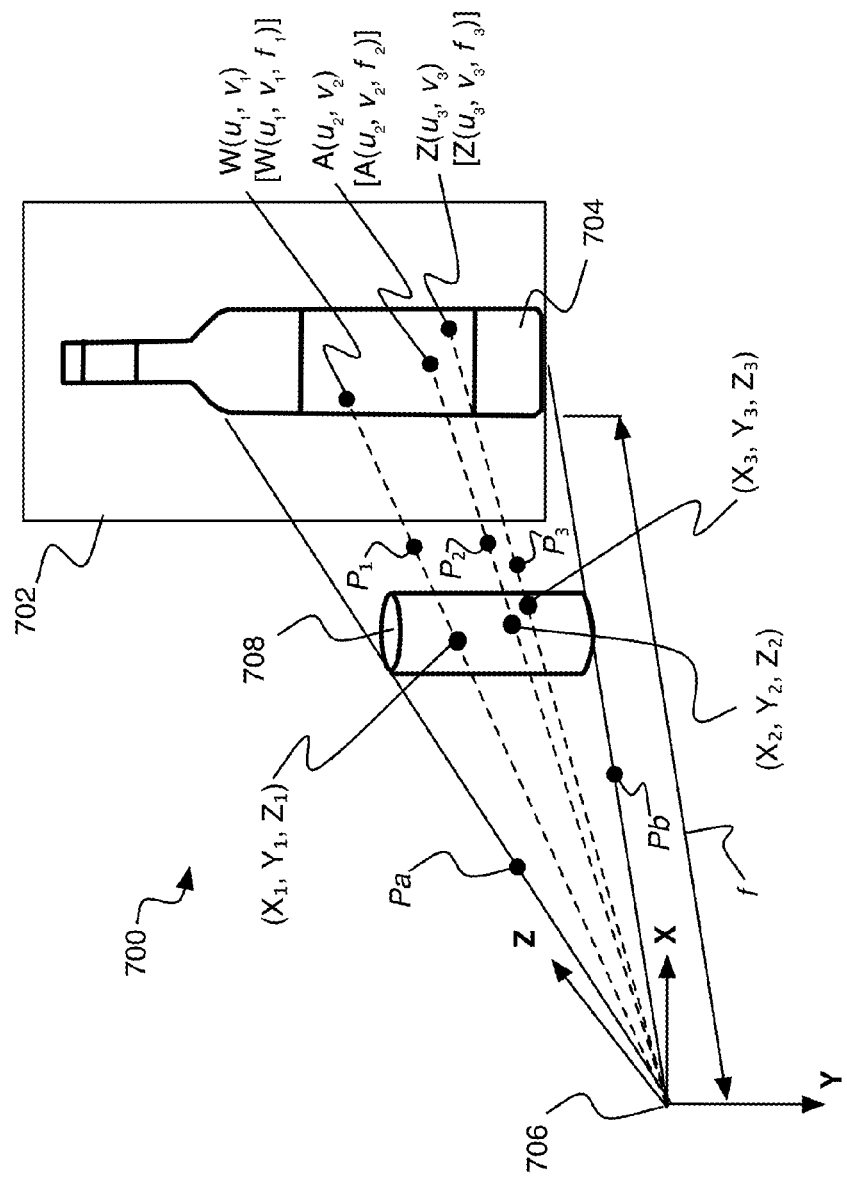
FIG. 7 is an image for showing 2D to 3D coordinate conversion for reference images for the method of curved object recognition in accordance with the implementations herein.

Referring to FIG. 7, process 300 may include "convert 2D points to 3D points on the reference object" 310, and a perspective projection diagram 700 with an image 702 is provided to show one example calculation. To build the image database with 3D geometric information from 2D images, the 2D coordinates of an image are converted to 3D coordinates by using perspective projection. This may initially include "define perspective projection space" 312, and particularly providing a real image 702 with a 2D reference object 704 and a camera origin 706, set as point (0, 0, 0) to define the perspective projection space between them.

Then, the process 300 may include "place a curved surface of a desired shape similar to the shape of the reference object and in the defined perspective projection space to fit the reference object in the image by perspective projection" 314. In one example, this may include making a curved surface 708 that may be a cylinder when the reference object 704, such as a bottle, is cylindrical. The curved surface 708 may be oriented in the perspective projection space to match the orientation of the reference object 704 as close as possible (such as setting vertical edges to be parallel). By one form, curved surface 708 is a cylindrical surface with a height of 1,000 pixels and a diameter of 500 pixels and may be used for a variety of cylindrical (or bottle) shapes of reference objects. The surface 708 is positioned between the reference object 704 and the camera origin 706, and by one form, is not limited as to how close or far the curved surface should be from the reference object as long as the position of the curved surface (by the equation of the surface) is known. By one form, however, the cylindrical surface 708 is placed so that outer most projection lines $P_a$ and $P_b$ from the origin and respectively to the outer two edges of the reference object (looking in top view for example) are substantially or approximately tangent to the cylindrical surface 708. Here, the origin 706 is placed a predetermined focus length f from the reference object 704, or more precisely, from the plane that forms the reference image with the reference object. The focal length f need not be perpendicular from the image 702 but usually is for simplicity. BY one example form below, the origin is placed on a line perpendicular from the center of the 2D reference object (by width and height).

The next operation to convert 2D to 3D coordinates for the database is to "connect 3D projection lines between a camera origin and interest points in the image" 316. Thus, the reference object or bottle 704 may initially have 2D coordinate interest points $W(u_1, v_1)$, $A(u_2, v_2)$, and $Z(u_3, v_3)$ where W, A, and Z are the words at those points as shown (where any point with these same words is designated with the same symbol similarly herein). Projection lines $P_a$ and $P_b$ extend from origin 706 to the highest left point and lowest right point on object 704 respectively, and projection lines $P_1$, $P_2$, and $P_3$ extend from the origin 706 and respectively to interest points $W(u_1, v_1)$, $A(u_2, v_2)$, and $Z(u_3, v_3)$ on the reference object 704. The distance from the origin (0, 0, 0) to the 2D interest points on the reference object (or in other words, to the plane forming the 2D image) and along the projection lines P also are considered focal distances f as mentioned above. Thus, the idea is to convert the 2D coordinate points $W(u_1, v_1)$, $A(u_2, v_2)$, and $Z(u_3, v_3)$ into 3D points $W(u_1, v_1, f_1)$, $A(u_2, v_2, f_2)$, and $Z(u_3, v_3, f_3)$ as shown on FIG. 7.

To accomplish this, the 2D to 3D conversion operation may include "estimate 3D coordinates from the corresponding 2D interest points" 318. This is accomplished by determining the equation of each projection line $P_1$, $P_2$, and $P_3$, and then finding the intersection of the projection line equations with the equation of the cylindrical surface 708. This determines the three-dimensional coordinates of the 2D interest points of the reference object 704 except on the cylindrical surface 708, and in this example, as points $W(X_1, Y_1, Z_1)$, $A(X_2, Y_2, Z_2)$, and $Z(X_3, Y_3, Z_3)$. In order to then project the three dimensional positions of the points on the curved surface 708 to the interest points $W(u_1, v_1, A)$, $A(u_2, v_2, f_2)$, and $Z(u_3, v_3, f_3)$ on the reference object 704, a number of different geometric and trigonometric equations may be used, and some may take advantage of the fact that the distance along the projection lines from the origin 706 to the curved surface 708 are proportional to the focal or depth distances $f_n$ from the origin 706 to the 3D point of the reference object 704.

By one possible example, since the cylinder 708 and object 704 are both cylindrical, the distance from the origin to the cylinder 708 is proportional to f (to the 2D plane of the reference image 702 along the same projection line. Thus, since the distances to the cylinder 708 are known, the focal distance $f_n$ to each point on the curved surface of the object 704 can be calculated.

By a more specific example, the focal length f is known from the origin and perpendicular to a center of the 2D image or reference object 704. The reference object has a determinable height img_h and img_w as measure in 2D on the image. The virtual cylinder 708 has a known width 'w' and height 'h'. A distance d between the origin 706 and the center of the virtual cylinder 708 (w/2, h/2) also is known. The 2D interest point locations on the 2D reference image 702 (without a specific depth measurement yet except to the plane of the 2D reference image 702) and also referred to as $(u_1, v_1, f)$, $(u_2, v_2, f)$, $(u_3, v_3, f)$ also are known.

To solve for the three-dimensional coordinates on the virtual cylinder 708 $(X_1, Y_1, Z_1)$, $(X_2, Y_2, Z_2)$, $(X_3, Y_3, Z_3)$, the process may solve the problem to find the intersection point between two equations (the projection line vector equation and the cylinder equation). The 3D line equation $P_1$ is:

$$\frac{x}{u_1 - \frac{img\_w}{2}} = \frac{y}{v_1 - \frac{img\_h}{2}} = \frac{z}{f} \qquad (1)$$

The 3D cylinder 708 equation is:

$$(z-d)^2 + y^2 = \left(\frac{w}{2}\right)^2, -\frac{h}{2} \le x \le \frac{h}{2} \qquad (2)$$

Calculating the intersection results in the calculation of points $(X_1, Y_1, Z_1)$ to $(X_3, Y_3, Z_3)$ and so on. Once the location of these 3D points on the virtual cylinder 708 are determined, the 3D coordinates of the 2D keypoints on the reference object can be calculated either by inputting the values into equation (1) for example or by using the proportionality of the distance from the origin to the virtual surface 808 (*d*) and the distance from the origin to the 2D image 702 (*f*).

Process 300 may include "store keypoint word(s) and 3D coordinates in a database" 320. Accordingly, the image database is composed of a set of reference images, their keypoints in 3D coordinates, the 2D coordinates of the keypoints (whether a separate field or shared with the 3D coordinates), the corresponding words, and the gradient orientation values used for BoW determinations for the examples used herein may be stored. Other feature values or other desired data alternatively or additionally may be stored in the database as well Now that the database is established, and during object recognition, a query image that includes a target object to be recognized may be compared or matched to objects from the database as follows.

Figure 8:
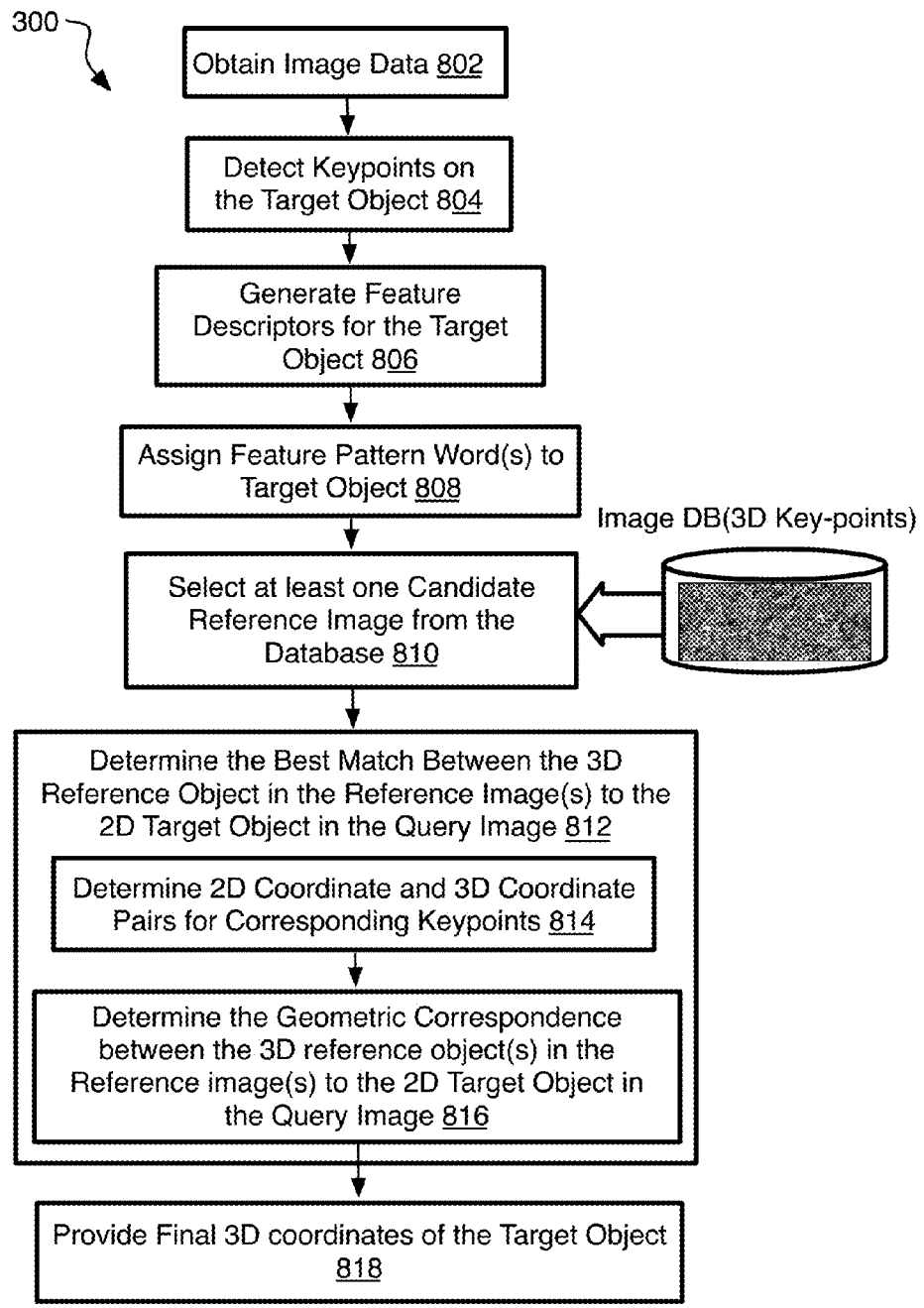
FIG. 8 is a detailed flow chart of a method of curved object recognition in accordance with the implementations herein.

Referring to FIG. 8, process 800 is provided for a method and system of curved object recognition using image matching for image processing. In the illustrated implementation, process 800 may include one or more operations, functions or actions 802 to 818 numbered evenly. By way of non-limiting example, process 800 may be described herein with reference to example image capture processing system 1200 of FIG. 12, and where relevant.

Process 800 includes "obtain image data" 802, and as already explained above with operation 302 of the database building process, the image data should include 2D (u, v) image data ready for keypoint detection. Here, the image may be considered a query image with at least one curved object in the image where it is desirable to have a device recognize the curved object for the reasons already mentioned above whether for computer vision, image modification, image augmentation, and so forth.

Process 800 includes "detect keypoints on the target object" 804, and again, as already described above for the database building process 300 in operation 304. The results are keypoints as shown on image 400 (FIG. 4) except instead of a reference image and reference object, the image 400 would be a query image with a target object 402.

Also, process 800 may include "generate feature descriptors for the target object" 806, and again, just as with feature descriptor generation operation 306 in the database building process 300. Thus, the result here also is feature descriptors (or feature vectors), one each for a grid patch around a keypoint on the target object and having one or more features. Accordingly, image 500 (FIG. 5) would now have feature descriptors 506 and 508 for a query image.

Process 800 includes "assign feature pattern word(s) to target object" 808. Here, similar to the data building process, feature vectors of the query image are compared to the feature vectors of the multiple images of the database. In this case, however, the words are already established for the reference images in the database. So for this operation, the feature vectors of the query image are added to the appropriate pre-established words of the database word index. The words, or more accurately the feature pattern clusters, are formed as mentioned above for the database building process. The words of each keypoint on the query image, or on the target object, are then used for the object recognition. Image 400 (FIG. 6) showing the word assignment operation from visual vocabulary 600 is equally applicable here.

Figure 9:
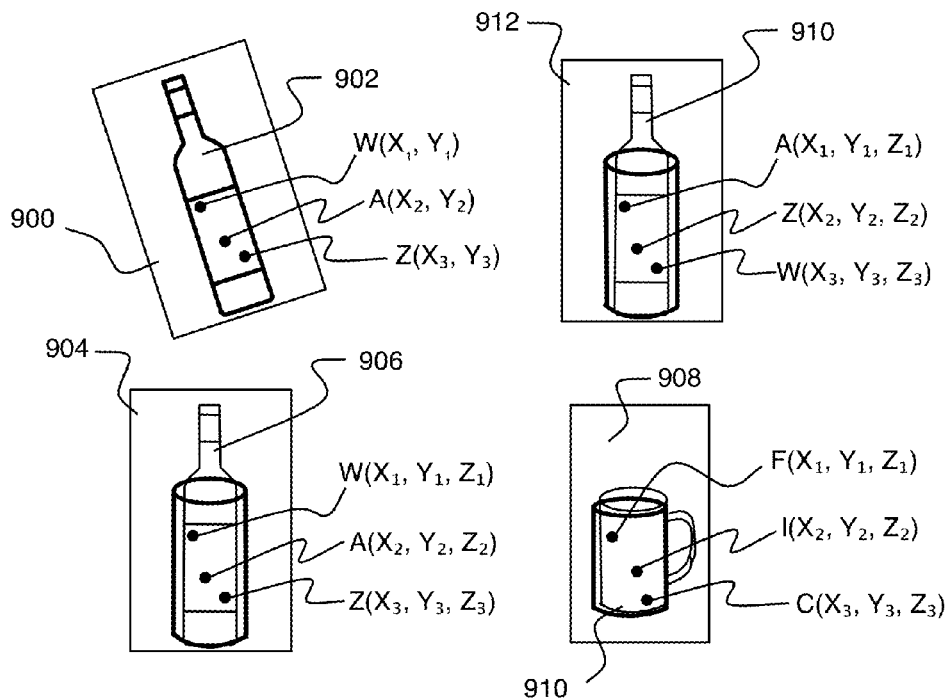
FIG. 9 is a diagram to explain candidate selection for the curved object recognition process in accordance with the implementations herein.

Referring to FIG. 9, process 800 may include "select at least one candidate reference image from the database" 810, and particularly, to reduce the number of reference images to be compared to the query image for matching. This also may be referred to as quick feature matching. This may be accomplished by several heuristic methods. These methods may test whether a property or characteristic of the words in the query image is the same in one of the candidate reference images. For instance, say there is five words in the query image. A pool of candidates may be determined by retrieving candidate reference frames that each have all five words (or some predetermined portion of them) from the database. Thus, a query image 900 with a target object 902 that is a bottle may have 2D keypoints with words W, A, Z, while reference images 904 and 912 respectively with a reference object 906 or 914 also are bottles and also have words W, A, and Z. Both of these would be a good initial candidate. In contrast, a candidate reference image 908 has a reference object 910 that is a mug and has words F, I, and C instead and would be rejected.

Then, in one example, less than all of the words (say three words when five are provided but all words could be used) are selected randomly from the query image to determine if the positions (or some other characteristic) of those words within the image (or more specifically at the target object) also is similar to the positions (or other characteristic) of the same words of the candidate reference object. By one example, this may include testing whether the words on the candidate reference object has the same rotational order (or generally circular clockwise or counter-clockwise order) as in the target object. For instance, while looking at an object 906, the words are positioned in a generally clockwise order ZAW which is the same order on object 902. The other object 914 may have the same words but in the clockwise order WZA. This is considered to be a non-match. The candidate with the wrong rotational order direction relative to that on the target object is rejected. Other quick tests are possible.

Process 800 then may include "determine the best match between the 3D reference object in the reference image(s) to the 2D target object in the query image" 812. This operation may include "determine 2D coordinate and 3D coordinate pairs for corresponding keypoints" 814, and particularly, this may be performed between the query image and each remaining candidate reference image. Once the candidate reference images are selected, the 2D keypoint coordinates of the query image are paired to the 3D coordinates of the keypoints of the reference image of the same word. The same word may or may not correspond to keypoints in the same exact (u, v) position on both the reference and query images. This may be performed for multiple or each 2D keypoint on the query image (or just on the target object), and for each pairing to a 3D coordinate on a candidate reference image (or reference object) when multiple candidate reference images are still maintained. At this point, since the candidate reference images may be indexed by word, no need exists to list and use all of the feature vector information for the word so that the points on the images can be selected by word, greatly reducing computational loads versus those comparisons that use the feature vector values in such a comparison. The result is that the 2D-3D paired points form an input data set for the geometric correspondence computations below.

Process 800 then may include "determine the geometric correspondence between the 3D reference object(s) in the reference image(s) to the 2D target object in the query image" 816. To find the geometric correspondence in 3D space, the relationship between points in 3D space can be represented by 3D transformations and, particularly, by rotation and translation matrices. The 3D rotation matrix is represented by three parameters from rotation angles of three different axes (X, Y, and Z). The 3D translation matrix also has three parameters by movements along the three axes (X, Y, Z). In order to measure the 3D geometric transformation from 2D target object to 3D reference object, a perspective projection equation (3) below may be used to find the values of the six parameters with the 2D-3D pairs of 3D coordinates in the reference image and 2D coordinates in the query image.

Figure 10:
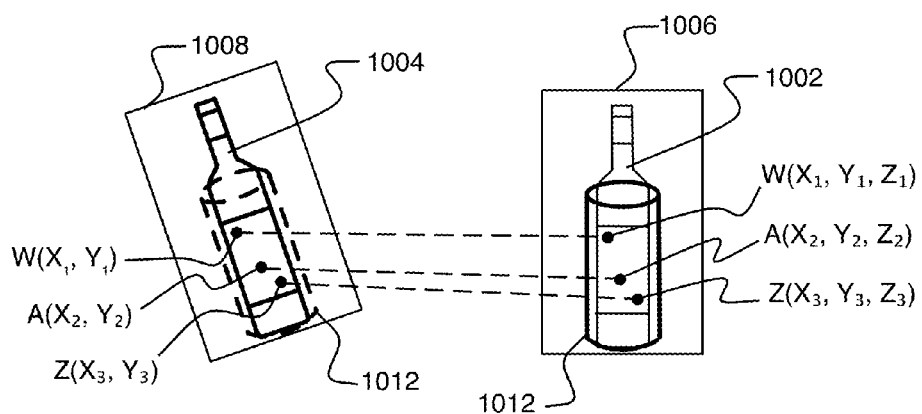
FIG. 10 is a diagram showing 3D curved shape matching for the curved object recognition process in accordance with the implementations herein.

Referring to FIG. 10, this transformation is represented by showing a reference object 1002 on a reference image 1006 that is being matched to a target object 1004 on a query image 1008. The reference object 1002 has three-dimensional coordinates at interest points with the words W, A, Z, and the target object 1004 has two-dimensional coordinates on the corresponding interest points of the target object 1004 and with the same words W, A, Z. Dashed lines indicate the transformation of 2D-3D pairs and from the 3D point on the reference object to the location of the corresponding 2D point of the target object, and represent the transformation being computed. The three-dimensional shape 1012 (here a cylinder) may represent the locations of the three dimensional coordinates from the reference object 1002 that are being fitted to (or overlaid on) the target object 1004. Also, the target object 1004 is shown at a slant relative to the reference object 1002 to show one possible shift in position and here requiring at least a rotational shift from one to the other.

As mentioned, a perspective projection function can represent the relationship between a 2D coordinate from the query image and 3D coordinate from the reference image in the database as follows:

$$[u\ v] = P(R[x\ y\ z]^T + T) \quad (3)$$

where [u v] is a 2D coordinate, $[x\ y\ z]^T$ is a transpose of the 3D coordinate paired to the 2D coordinate [u v], P is the perspective projection function, R is a rotation matrix, and T is a translation matrix. By Equation (3) and the pairs of 2D and 3D coordinates, the problem to find 3D geometric correspondence is transformed into a problem to estimate parameters of a mathematical model from a set of observed data which contains outliers. RANSAC or other parameterization techniques such as Hough transform may be used. One example using RANSAC is provided below.

In more detail, and by one example, a 3D transformation function M is:

$$M\left(\begin{bmatrix} x \\ y \\ z \end{bmatrix}\right) = \begin{bmatrix} 1 & -w_z & w_y \\ w_z & 1 & -w_z \\ -w_y & w_x & 1 \end{bmatrix} \begin{bmatrix} x \\ y \\ z \end{bmatrix} \quad (4)$$

where intermediate-rotational parameters $w_x$, $w_y$, $w_z$ are related to rotation parameters $r_x$, $r_y$, $r_z$ (recited below) which are the amounts of rotation about the three different axes X, Y, Z. Parameters $t_x$, $t_y$, $t_z$ (also recited below) are respectively related to the amount of translation along the X, Y, and Z directions. To obtain the rotation parameter $r_x$, $r_y$, $r_z$ that indicate an amount of rotation each about a different axis (X, Y, or Z), a "Rodrigues transform" is used to convert a rotation matrix:

$$\begin{bmatrix} 1 & -w_z & w_y \\ w_z & 1 & -w_x \\ -w_y & w_x & 1 \end{bmatrix} \quad (5)$$

to a rotation parameter vector:

$$\begin{bmatrix} r_x \\ r_y \\ r_z \end{bmatrix} \quad (6)$$

Then, a perspective projection function P may be defined as follow:

$$\begin{bmatrix} u \\ v \end{bmatrix} = P\left(\begin{bmatrix} x \\ y \\ z \end{bmatrix}\right) = \frac{f}{z} \begin{bmatrix} x \\ y \end{bmatrix} \quad (7)$$

where f is focal length from an origin and to the 2D surface of the target object (or the plane of the 2D query image), and may be any desired or efficient value, and by one example, may be equal to 1000 pixels in the same resolution as used by the target and reference images. The final object function becomes:

$$\begin{bmatrix} u \\ v \end{bmatrix} = P\left(M\left(\begin{bmatrix} x \\ y \\ z \end{bmatrix}\right)\right) = \frac{f}{-w_y x + w_x y + z + t_z} \begin{bmatrix} x - w_z y + w_y z + t_x \\ w_z x + y - w_x + t_y \end{bmatrix} = F \quad (8)$$

Any paired 2D coordinates (from the query object) and 3D coordinates (from a candidate reference object) can then be used as the input in an object function such as equation (6) above, and which may be represented as F( ) as shown by equation (9) below.

$$\begin{bmatrix} u \\ v \end{bmatrix} = F\left(\begin{bmatrix} x \\ y \\ z \end{bmatrix}; w_x, w_y, w_z, t_x, t_y, t_z\right) \quad (9)$$

This can then be solved by using least squares and by a parameterization algorithm such as RANSAC to find the best solution. These algorithms such as RANSAC iterate through the parameter space of the equation to find hypothetical or initial cylindrical surfaces with initial parameters. This results in cylindrical hypothesis (and initial parameters) for each set of 2D-3D pair inputs to the equation (9) during a single iteration.

A max iteration number K can then be computed as:

$$K = \frac{\log(1-p)}{1-w^N} \quad (10)$$

where w is the percentage of inliers in the total input data set of paired 2D-3D coordinates of the target object and reference object and for all candidate reference images being used. The coordinate pairs are referred to simply as 2D-3D pairs below. An inlier is a computed 2D-3D pair that satisfies the object function after a 2D-3D pair from the input set is input to the object function to determine initial parameters as explained below. When such a computed 2D-3D pair satisfies the object function and has coordinate values in the input set (or coordinate values sufficiently close to the values of a pair in the input set as explained below), then that 2D-3D pair is an inlier. Those pairs that satisfy the object function but are not in the input set are considered outliers. w may be set at 0.3 (or 30%) by one example, and is determined by experimentation. N is the number of samples selected by randomly sampling the input data set and may be set at a desired predetermined value, while p is the probability that the RANSAC algorithm in some iteration selects only inliers from the input data set. By one form, p is set at 0.99.

Referring to FIG. 10A, with consideration of the factors set out immediately above, the operation to find the best parameters for the sets of 2D-3D pairs then may be as follows as in process 1050 where the operations are numbered generally evenly from 1052 to 1076. By way of non-limiting example, process 1050 may be described herein with reference to example image capture processing system 1200 of FIG. 12, and where relevant.

Process 1050 may include "set k=1" 1052 where max k=K and as defined above, and to count down the number of iterations that will be performed, where the computations are performed for each iteration from k=1 to K.

Process 1050 then may include "obtain N random samples from the input set of paired 2D and 3D coordinates" 1054, and where N is defined above and where a max n=N. The process will loop for each iteration k as explained below so that a new batch of 2D-3D pair input samples N are randomly selected for each iteration k. Thus, some 2D-3D pair input samples may be selected more than once so that the same 2D-3D pairs may be used for different iterations.

It also will be understood that for this process, the random sample 2D-3D pairs that form the input set may be obtained from multiple or all candidate reference images to be grouped and tested together. Thus, when initial parameters are computed using a set of N sample 2D-3D pairs, the object function may be used to determine inliers that satisfy the object function and from multiple or all candidate reference images. In these cases, the inliers may be determined reference image by reference image, but could be many other orders. The order of testing from reference image to reference image or some other order of input is not necessarily critical as long as the order is efficient and the correct inliers, no matter the candidate reference image, are tested for each iteration k.

Process 1050 then may include "solve the object function by using the random samples to find the parameters of the function" 1058. In detail, this operation may first include "use N samples to determine parameters for the object function" 1060, and as explained above by finding intermediate-rotational parameters $w_x$, $w_y$, $w_z$, and translation parameters $t_x$, $t_y$, $t_z$. The parameters are determined for the object function of equation (9) recited above, and repeated here as one example object function:

$$\begin{bmatrix} u \\ v \end{bmatrix} = F\left(\begin{bmatrix} x \\ y \\ z \end{bmatrix}; w_x, w_y, w_z, t_x, t_y, t_z\right) \quad (11)$$

As mentioned above, the parameters are calculated by using the set of N sample 2D-3D pairs and a parametric technique such as RANSAC to determine a single set of parameters for the sample set of input 2D-3D pairs for a single iteration, and this is repeated for each iteration.

Then, once the parameters are determined, the parameters may be plugged into the object function so that this operation then may include "find input inliers from the input data set and by using the computed parameters" 1062. Accordingly, multiple or all of the other 2D-3D pairs that form the input data set are then tested to determine whether the object function is satisfied. This may include "compute estimate coordinates of one point by using the coordinates of the other point of the 2D-3D pair" 1063. Specifically, for the individual 2D-3D pairs of the input set, a 3D (x, y, z) point of a 2D-3D pair may be plugged into the object function (equation (11) above) with the parameters already determined from N sample inputs of the 2D-3D pairs. This results in estimate coordinates (u\*, v\*) for the 2D point in each of the 2D-3D pairs being tested. Then, the operation to find inliers may include "count 2D-3D pair as an inlier when the estimate coordinates are within a threshold of actual coordinates of the 2D-3D pair in the input set" 1064. Thus, for one example, a difference may be computed between the values of the estimate coordinates (u\*, v\*) and the actual 2D coordinates (u, v) of a point in the 2D-3D pair that is in the input set. This difference may be a Euclidean distance or other difference. When the difference is less than a threshold, then this 2D-3D pair is considered an inlier. The threshold may be determined by experimentation. It should be noted that the 2D coordinates could be inputted into the object function to compute and compare the 3D coordinates instead of the 2D coordinates as just described. It will be understood that the 2D coordinates may be entered into the objection function to compute the 3D coordinates instead when desired. The number of inliers that satisfy the object function are counted and totaled up.

Then a check is performed and it is determined whether the "number of present inliers>number of best inliers?" 1065. At first, the number of best inliers is zero, and so the first number of present inliers that satisfy the object function, no matter how many as long as it is over zero, satisfies this test, and the present inliers become the best inliers, and the number of present inliers become the number of best inliers (1066). Thereafter, the test is repeated for each iteration k so that whenever there are more present inliers than best inliers, those present inliers become the best inliers and the number of present inliers becomes the number of best inliers.

When the number of present inliers is less than the number of best inliers, the operation skips the setting of the best inliers.

Otherwise, when the last sample inlier N is already analyzed, the process determines a check "k=K?" 1072 to determine whether the last iteration has been analyzed. If not, an operation is performed "set k=k+1" 1074, to start the next iteration, and the process loops back to operation 1054 to obtain another batch of randomly selected sample inputs N to repeat the object function computations and test against the last best inliers.

If the last iteration k is reached and analyzed, the process 1050 then continues with "determine the final best parameters by solving the object function again using the best inliers" 1076, and this may be performed since the last parameters used may not necessarily be the best parameters. This sets the final parameters and by using equation (9) above again. Thereafter the final parameters can be used to determine the 3D coordinates for any 2D coordinates on the target image. This of course includes converting the intermediate-rotational parameters to rotational parameters according to the Rodrigues transform with matrices (5) and (6) for one example.

It will be understood that other enhancement or refinement operations may be performed once the final object function is established such as any shape or color hole or gap filling, and so forth, or any other pre-processing (before applications use the 3D coordinates) operations that need 3D coordinates of the object to perform.

Accordingly, the process may then continue with process 800, and may include "provide final 3D coordinates of target object" 818. This may include providing the final object function or computed 3D coordinates in an index or an object depth map or depth image for example, and to another application. As mentioned, computer vision applications may use the 3D coordinates to identify the objects in the image. Otherwise, the target object can be moved in three-dimensional space or may be augmented with virtual objects (such as a different label for a wine bottle) in realistic 3D perspectives that match the 3D perspective of the target object.

Figure 11:
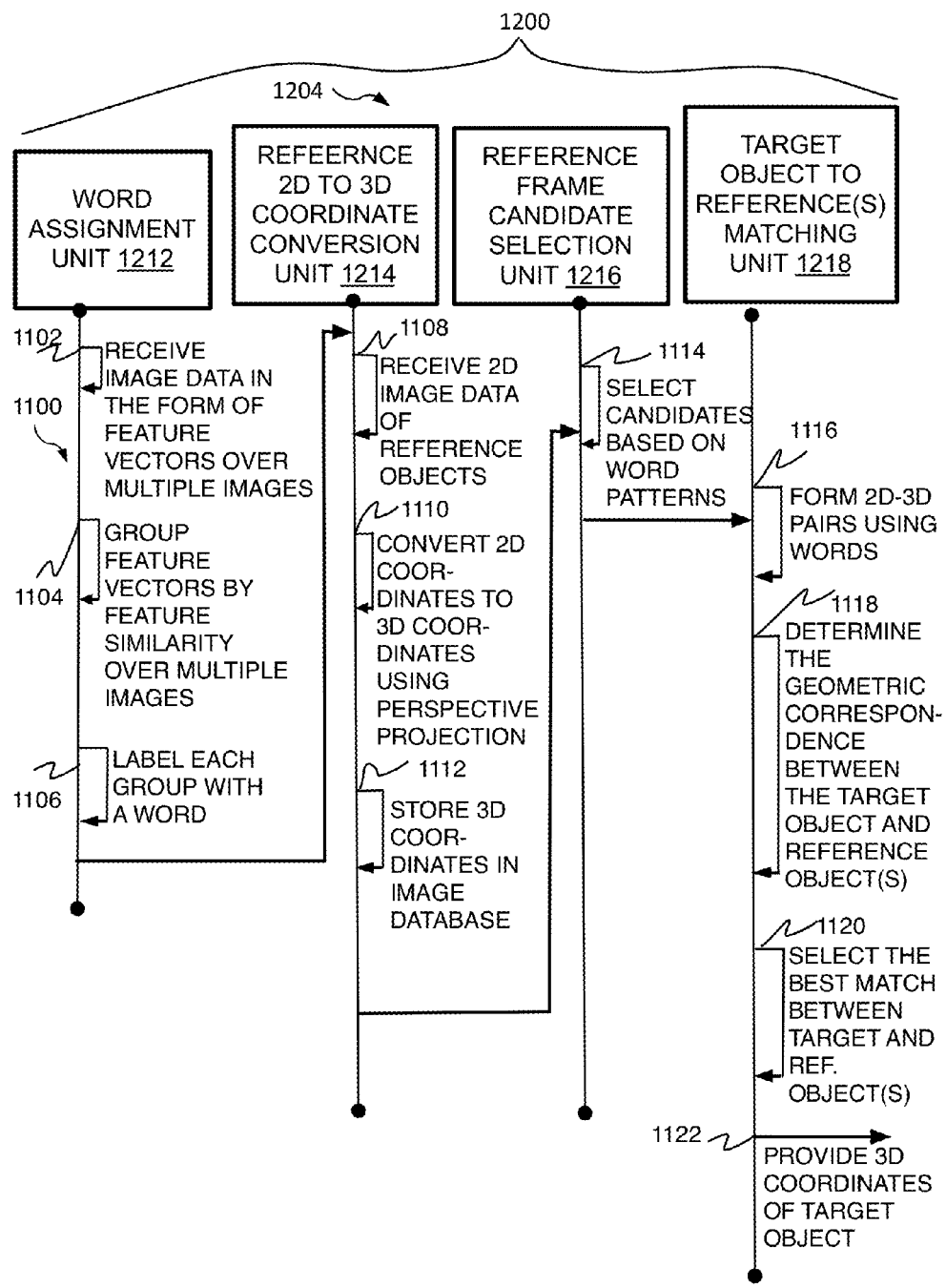
FIG. 11 is a diagram of the curved surface detection method in operation by an example system described herein.

Referring to FIG. 11, process 1100 illustrates the operation of a sample image processing system 1200 that performs curved object recognition using image matching for image processing in accordance with at least some implementations of the present disclosure. In more detail, in the illustrated form, process 1100 may include one or more operations, functions or actions as illustrated by one or more of actions 1102 to 1122 numbered evenly. By way of non-limiting example, process 1100 will be described herein with reference to FIG. 12. Specifically, system 1200 includes logic units or modules 1204. The logic modules 1204 may include an object recognition unit 1206 that has a keypoint detection unit 1208, a feature descriptor unit 1210, a word assignment unit 1212, a reference 2D to 3D coordinate conversion unit 1214, a reference frame candidate selection unit 1216, and a target object to reference(s) matching unit 1218. The operation of the system may proceed as follows.

Process 1100 may include "receive image data in the form of feature vectors over multiple images" 1102, and as described above with processes 300 and 800, where the raw image data has already been pre-processed, keypoints have been detected, and feature descriptors (or feature vectors) for individual keypoints were formed. This applies both to reference images and to query images. It will be understood that the images may be single photos or frames in a video sequence. The details are provided above.

Process 1100 may include "group feature vectors by feature similarity over multiple images" 1104. Particularly, this refers to using a technique such as bag of words (BoW) described above to form clusters of feature vectors also as described above. Process 1100 then may include "label each group with a word" 1106, also as known in BoW techniques, which may be indicated herein as a single letter (A or Z for example). The details are provided above.

Process 1100 may include "receive 2D image data of reference objects" 1108, and as described above, the 2D coordinates of the points of the reference objects that have already been assigned a word. Here, at least the points of the reference objects in the images are obtained.

Process 1100 may include "convert 2D coordinates to 3D coordinates using perspective projection" 1110. This may include defining a 3D space, placing a virtual object with a similar shape to the reference object (such as a cylinder to match an image of a bottle) and into the 3D space. Projection lines from an origin, through the virtual object and onto the reference object on the reference image then may be used to calculate the 3D coordinates of the 2D points on the reference object as already explained above. It will be understood that other methods of perspective projection may be used.

Process 1100 then may include "store 3D coordinates in image database" 1112, and particularly, the 3D coordinates calculated for points on the reference object(s) using the perspective projection. The 3D coordinates may be stored along with the image of which they are a part as well as the listed word for the keypoint. The 3D points then may be used to pair 2D and 3D points from target and reference object respectively, and then convert the 2D points to 3D coordinates for the target object also as explained above.

By yet another alternative, this object recognition process still may be used when there is a depth map for the reference images but not for the query images. In that case, the 3D points for the reference images may be obtained from the depth map instead.

Process 1100 may include "select candidates based on word patterns" 1114. For this operation, the process first selects candidate reference images or reference objects that have the same words as the query image (or target object). Then, the word pattern, which in turn indicates a feature vector pattern, on the target object and reference object(s) from the candidates are compared. The reference images with reference objects that have the same or similar word pattern as the target object are kept as candidate reference frames. By one form, as mentioned, a rotational order or pattern (clockwise or counterclockwise position of a selected number of the words on the images for example) is used as the test pattern as explained above. It will be understood other word patterns maybe used instead of or in addition to the rotational pattern. Other details are provided above.

The process 1100 then may include "form 2D-3D pairs using words" 1116, and specifically, and as already described above, 2D points of a target object may be paired with 3D points of one or more reference objects when the 2D point and the 3D point have the same word, by one example. More details are provided above.

The process 1100 then may include "determine the geometric correspondence between the target object and reference object(s)" 1118. This includes using a sampling of the 2D-3D pairs in a perspective projection function or equation (and by one example equations (8), (9) or (11) above) to determine the transition (rotation and/or translation) parameters for the equation. This may be performed by using a parameterization technique over a selected number of iterations that each may use a newly selected batch of sample 2D-3D pairs from an input set. Once the sample of 2D-3D pairs is inputted into the equation, the parameters are determined and then kept in the equation to determine whether any other 2D-3D pairs satisfy the equation (referred to as inliers). New parameters are calculated for each iteration and may have a new set of sample 2D-3D pairs inputted into the equation. The details are explained above.

Process 1100 may include "select the best match between target and reference object(s)" 1120, and as explained above, the best match is obtained by the equation with the parameters that have the most inlier 2D-3D pairs that satisfy the equation with those parameters. The parameters with the most 2D-3D pairs satisfying the equation is set as the final parameters to determine 3D coordinates for any 2D point on the target object going forward. The details are explained above.

Process 1100 may include "provide 3D coordinates of target object" 1122. Thus, a final index map, depth map, or perspective projection equation with the final parameters and for the target object may be provided so that 3D coordinates of the target object can be used to modify or augment the target object, or identify the target object using computer vision, or many other uses. Details are discussed above.

In addition, any one or more of the operations of FIGS. 3, 8, 10A, and 11 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 12:
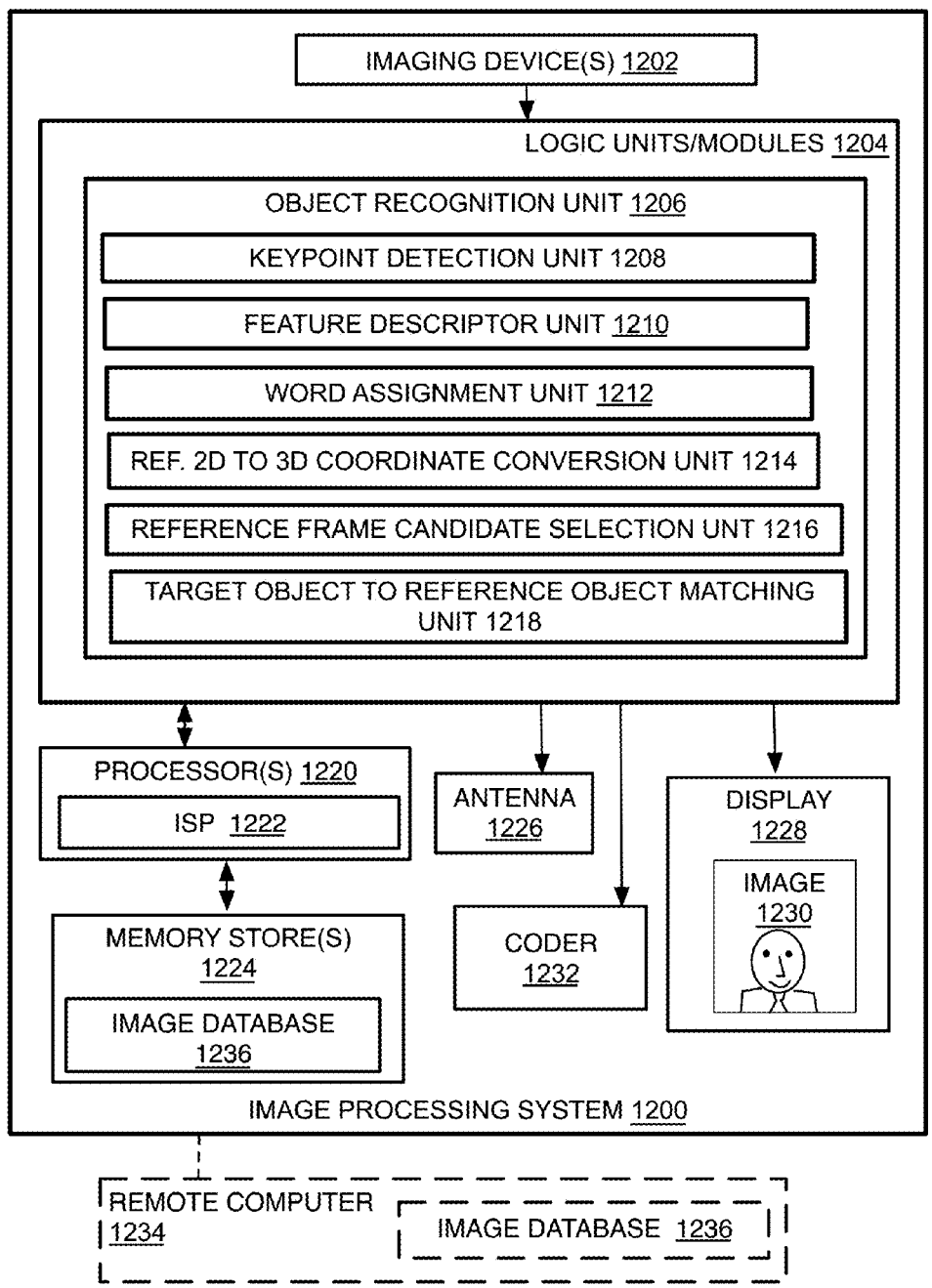
FIG. 12 is an illustrative diagram of an example system.

Referring to FIG. 12, an example image processing system 1200 is arranged in accordance with at least some implementations of the present disclosure. In various implementations, the example image processing system 1200 may have an imaging device 1202 to form or receive captured image data. This can be implemented in various ways. Thus, in one form, the image processing system 1200 may be one or more digital cameras or other image capture devices, and imaging device 1202, in this case, may be the camera hardware and camera sensor software, module, or component. In other examples, imaging processing system 1200 may have an imaging device 1202 that includes or may be one or more cameras, and logic modules 1204 may communicate remotely with, or otherwise may be communicatively coupled to, the imaging device 1202 for further processing of the image data.

Thus, image processing device 1200 may be a camera considered to be a smartphone, tablet, laptop, or other mobile device. Otherwise, device 1200 may be the tablet or other device with one or more cameras where the processing occurs at one of the cameras or at a separate processing location communicating with the cameras whether on-board or off of the tablet or other device, and whether the processing is performed at a mobile device or not.

In any of these cases, such technology may include a camera such as a digital camera system, a dedicated camera device, or an imaging phone or tablet, whether a still picture or video camera, camera that provides a preview screen, or some combination of these. Thus, in one form, imaging device 1202 may include camera hardware and optics including one or more sensors as well as auto-focus, zoom, aperture, ND-filter, auto-exposure, flash, and actuator controls. These controls may be part of a sensor module or component for operating the sensor that can be used to generate images for a viewfinder and take still pictures or video. The imaging device 1202 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)) in addition to, or instead of, the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in the alternative to a camera sensor. In some examples, imaging device 1202 may be provided with an eye tracking camera.

In the illustrated example and relevant here, the logic units or modules 1204 may include an object recognition unit 1206 that has a keypoint detection unit 1208, a feature descriptor unit 1210, a word assignment unit 1212, a reference 2D to 3D coordinate conversion unit 1214, a reference frame candidate selection unit 1216, and a target object to reference(s) matching unit 1218. The operation of the units are described in detail above. It will be understood that the object recognition unit 1206 may be located on a mobile device providing the processing of other units or may be located remotely at a server, the cloud, and so forth. In these examples, the logic modules 1204 may be considered to be separate from the imaging device or may be considered to be part of the imaging device, or one of the imaging devices when multiple imaging devices are provided.

The image processing system 1200 may have one or more processors 1220 which may include a dedicated image signal processor (ISP) 1222 such as the Intel Atom, memory stores 1224, one or more displays 1228 to provide images 1230, a coder 1232, and antenna 1226. In one example implementation, the image processing system 1200 may have the display 1228, at least one processor 1220 communicatively coupled to the display, and at least one memory 1224 communicatively coupled to the processor and that may or may not be storing the image database 1236 discussed herein or other image data. It also will be noted that a remote computer 1234 may be provided with parts of, or the entire, image database 1236 when the current device has limited memory capacity, for example. A coder 1232, which may be an encoder, decoder, or both, also may be provided. As an encoder 1232 and antenna 1226 may be provided to compress the modified image date for transmission to other devices that may display or store the image. It will be understood that the image processing system 1200 also may include a decoder (or encoder 1232 may include a decoder) to receive and decode image data for processing by the system 1200. Otherwise, the processed image 1230 may be displayed on display 1228 or stored in memory 1224. As illustrated, any of these components may be capable of communication with one another and/or communication with portions of logic modules 1204 and/or imaging device 1202. Thus, processors 1220 may be communicatively coupled to both the image device 1202 and the logic modules 1204 for operating those components. By one approach, although image processing system 1200, as shown in FIG. 12, may include one particular set of blocks or actions associated with particular components or modules, these blocks or actions may be associated with different components or modules than the particular component or module illustrated here.

Figure 13:
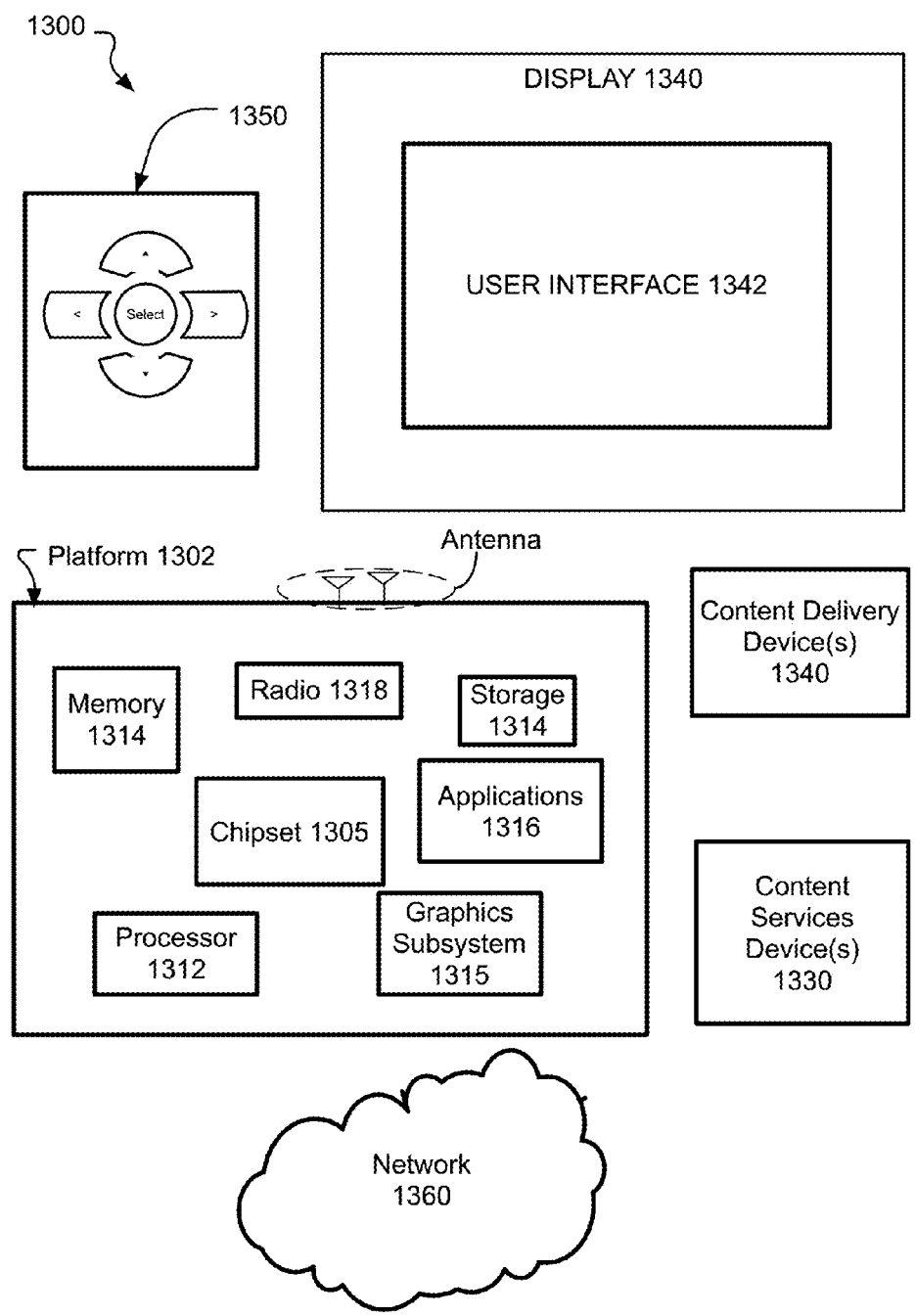
FIG. 13 is an illustrative diagram of another example system.

Referring to FIG. 13, an example system 1300 in accordance with the present disclosure operates one or more aspects of the image processing system described herein. It will be understood from the nature of the system components described below that such components may be associated with, or used to operate, certain part or parts of the image processing system 1200 described above. In various implementations, system 1300 may be a media system although system 1300 is not limited to this context. For example, system 1300 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, Display Port, wireless HDMI, and/or wireless HD compliant techniques. Graphics subsystem 1315 may be integrated into processor 1310 or chipset 1305. In some implementations, graphics subsystem 1315 may be a stand-alone card communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of unidirectionally or bidirectionally communicating content between content providers and platform 1302 and/display 1320, via network 1360 or directly. It will be appreciated that the content may be communicated unidirectionally and/or bidirectionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of controller 1350 may be used to interact with user interface 1322, for example. In implementations, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In implementations, controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various implementations, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various implementations, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 13.

Figure 14:
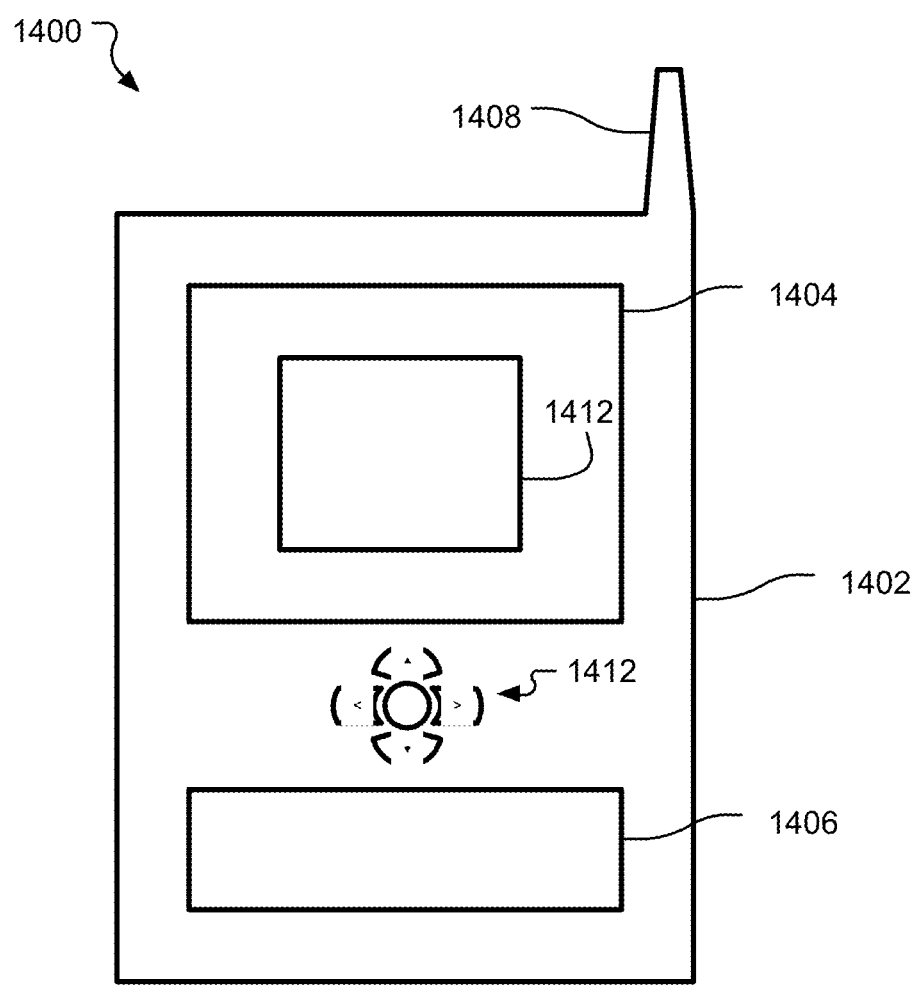
FIG. 14 illustrates another example device, all arranged in accordance with at least some implementations of the present disclosure.

Referring to FIG. 14, a small form factor device 1400 is one example of the varying physical styles or form factors in which system 1200 and/or 1300 may be embodied. By this approach, device 1400 may be implemented as a mobile computing device having wireless capabilities and multiple cameras. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet with or without multiple cameras, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 14, device 1400 may include a housing 1402, a display 1404 including a screen 1410, an input/output (I/O) device 1406, and an antenna 1408. Device 1400 also may include navigation features 1412. Display 1404 may include any suitable display unit for displaying information appropriate for a mobile computing device. I/O device 1406 may include any suitable I/O device for entering information into a mobile computing device. Examples for I/O device 1406 may include an alphanumeric keyboard, a numeric keypad, a touch pad, input keys, buttons, switches, rocker switches, microphones, speakers, voice recognition device and software, and so forth. Information also may be entered into device 1400 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of object recognition comprises obtaining image data of at least one reference image having at least one curved reference object and from a plurality of reference images each with at least one reference object, and wherein the image data comprises at least three-dimensional coordinates of three-dimensional (3D) points on the at least one curved reference object; obtaining two-dimensional (2D) image data of a curved target object in a query image; matching the target object to at least one of the reference objects comprising pairing at least one 2D point from the target object with a corresponding 3D point on at least one of the reference objects; and using the paired 2D-3D point(s) to form a perspective projection function to determine a geometric correspondence between the target object and reference object(s) and that converts the 2D points into 3D points at the target object.

By another implementation, the method may include wherein the curved objects are at least partially cylindrical; and wherein the reference image initially includes 2D image data and the three-dimensional coordinates for the reference images in the database are generated without the use of a depth map. The method also may comprise generating the three-dimensional coordinates of the reference objects by using perspective projection from a virtual 3D surface selected to have a shape similar to the shape of the reference object; and selecting one or more candidate reference images from the plurality of reference images to pair the 3D points of the reference objects of the candidate reference images to the 2D points of the target object of the query image, wherein selecting one or more candidate reference images comprises selecting candidate reference images with reference objects depending on, at least in part, a similarity in feature vectors; wherein selecting one or more candidate reference images comprises selecting candidate reference images with reference objects having at least some of the same words from a bag of words (BoW) type algorithm and generally in the same pattern of words as a pattern of words on the target object, and wherein the pattern is generally either a clockwise circular pattern or counter-clockwise circular pattern.

The method also comprises pairing the 2D points to the 3D points depending on, at least in part, a similarity in feature vectors; pairing the 2D points to the 3D points by using a bag of words (BoW) type algorithm to match 2D points to 3D points with the same word; using a perspective projection equation to determine the transition parameters between one 2D point on the target object and a paired 3D point on the reference object, and wherein the equation is to be used to determine 3D coordinates for other 2D points on the target object; and using a parametric algorithm that performs a number of iterations to determine the parameters for the perspective projection equation; wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters; and wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold; randomly selecting a set of sample pairs from a potential input set of the pairs for each iteration of a plurality of iterations; and selecting the parameters as final parameters that satisfies the highest number of other 2D-3D pairs.

By other approaches, the operations provided by the method may similarly be provided by a system, and particularly, a computer-implemented system that has at least one display, at least one memory to receive reference image data and query image data, at least one processor communicatively coupled to the at least one memory and at least one display, and a curved object recognition unit operated by the at least one processor and to: obtain image data of at least one reference image having at least one curved reference object and from a plurality of reference images each with at least one reference object, and wherein the image data comprises at least three-dimensional coordinates of three-dimensional (3D) points on the at least one curved reference object; obtain two-dimensional (2D) image data of a curved target object in a query image; match the target object to at least one of the reference objects comprising pairing at least one 2D point from the target object with a corresponding 3D point on at least one of the reference objects; and use the paired 2D-3D point(s) to form a perspective projection function to determine a geometric correspondence between the target object and reference object(s) and that converts the 2D points into 3D points at the target object.

By other approaches, the system may comprise that the curved objects are at least partially cylindrical; and wherein the reference image initially includes 2D image data and the three-dimensional coordinates for the reference images in the database are generated without the use of a depth map. The curved object recognition unit is to: generate the three-dimensional coordinates of the reference objects by using perspective projection from a virtual 3D surface selected to have a shape similar to the shape of the reference object; and select one or more candidate reference images from the plurality of reference images to pair the 3D points of the reference objects of the candidate reference images to the 2D points of the target object of the query image, wherein selecting one or more candidate reference images comprises selecting candidate reference images with reference objects depending on, at least in part, a similarity in feature vectors; and wherein select one or more candidate reference images comprises selecting candidate reference images with reference objects having at least some of the same words from a bag of words (BoW) type algorithm and generally in the same pattern of words as a pattern of words on the target object, and wherein the pattern is generally either a clockwise circular pattern or counter-clockwise circular pattern.

The curved object recognition unit also may be to: pair the 2D points to the 3D points depending on, at least in part, a similarity in feature vectors; pair the 2D points to the 3D points by using a bag of words (BoW) type algorithm to match 2D points to 3D points with the same word; use a perspective projection equation to determine the transition parameters between one 2D point on the target object and a paired 3D point on the reference object, and wherein the equation is to be used to determine 3D coordinates for other 2D points on the target object; and use a parametric algorithm that performs a number of iterations to determine the parameters for the perspective projection equation; wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters; and wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold; randomly select a set of sample pairs from a potential input set of the pairs for each iteration of a plurality of iterations; and select the parameters as final parameters that satisfies the highest number of other 2D-3D pairs.

By one approach, the features provided by the method and/or system may be provided by at least one computer readable medium having stored thereon instructions that when executed cause a computing device to: obtain image data of at least one reference image having at least one curved reference object and from a plurality of reference images each with at least one reference object, and wherein the image data comprises at least three-dimensional coordinates of three-dimensional (3D) points on the at least one curved reference object; obtain two-dimensional (2D) image data of a curved target object in a query image; match the target object to at least one of the reference objects comprising pairing at least one 2D point from the target object with a corresponding 3D point on at least one of the reference objects; and use the paired 2D-3D point(s) to form a perspective projection function to determine a geometric correspondence between the target object and reference object(s) and that converts the 2D points into 3D points at the target object.

By a further approach, the instructions may cause the computing device to include wherein the curved objects are at least partially cylindrical; and wherein the reference image initially includes 2D image data and the three-dimensional coordinates for the reference images in the database are generated without the use of a depth map. The computing device is to: generate the three-dimensional coordinates of the reference objects by using perspective projection from a virtual 3D surface selected to have a shape similar to the shape of the reference object; and select one or more candidate reference images from the plurality of reference images to pair the 3D points of the reference objects of the candidate reference images to the 2D points of the target object of the query image, wherein selecting one or more candidate reference images comprises selecting candidate reference images with reference objects depending on, at least in part, a similarity in feature vectors; and wherein select one or more candidate reference images comprises selecting candidate reference images with reference objects having at least some of the same words from a bag of words (BoW) type algorithm and generally in the same pattern of words as a pattern of words on the target object, and wherein the pattern is generally either a clockwise circular pattern or counter-clockwise circular pattern.

The computing device is to: pair the 2D points to the 3D points depending on, at least in part, a similarity in feature vectors; pair the 2D points to the 3D points by using a bag of words (BoW) type algorithm to match 2D points to 3D points with the same word; use a perspective projection equation to determine the transition parameters between one 2D point on the target object and a paired 3D point on the reference object, and wherein the equation is to be used to determine 3D coordinates for other 2D points on the target object; and use a parametric algorithm that performs a number of iterations to determine the parameters for the perspective projection equation; wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters; wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold; randomly select a set of sample pairs from a potential input set of the pairs for each iteration of a plurality of iterations; and select the parameters as final parameters that satisfies the highest number of other 2D-3D pairs.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of object recognition comprising:
    obtaining image data of at least one reference image having at least one curved reference object, wherein the obtaining image data of at least one reference image is from a plurality of reference images each with at least one reference object, and wherein the obtained image data comprises at least three-dimensional coordinates of three-dimensional (3D) points on the at least one curved reference object;
    obtaining two-dimensional (2D) image data of a curved target object in a query image;
    selecting one or more candidate reference images from the plurality of reference images to pair the 3D points of the reference objects of the candidate reference images to the 2D points of the target object of the query image, wherein selecting one or more candidate reference images comprises selecting candidate reference images with reference objects having at least some of the same words from a bag of words (BoW) type algorithm and generally in the same pattern of words as a pattern of words on the target object;
    matching the target object to at least one of the reference objects comprising pairing at least one 2D point from the target object with a corresponding 3D point on at least one of the reference objects as a portion of performing object recognition; and
    using the paired 2D-3D point to form a perspective projection function to determine a geometric correspondence between the target object and reference object and that converts the 2D points into 3D points at the target object.

2. The method of claim 1 wherein the curved objects are at least partially cylindrical.

3. The method of claim 1 wherein the reference image initially includes 2D image data and the three-dimensional coordinates for the reference images in a database are generated without a use of a depth map.

4. The method of claim 1 comprising generating the three-dimensional coordinates of the reference objects by using perspective projection from a virtual 3D surface selected to have a shape similar to the shape of the reference object.

5. The method of claim 1 wherein selecting one or more candidate reference images comprises selecting candidate reference images with reference objects depending on, at least in part, a similarity in feature vectors.

6. The method of claim 1 wherein the pattern is generally either a clockwise circular pattern or counter-clockwise circular pattern.

7. The method of claim 1 comprising pairing the 2D points to the 3D points depending on, at least in part, a similarity in feature vectors.

8. The method of claim 1 comprising pairing the 2D points to the 3D points by using a bag of words (BoW) type algorithm to match 2D points to 3D points with the same word.

9. The method of claim 1 comprising using a perspective projection equation to determine the transition parameters between one 2D point on the target object and a paired 3D point on the reference object, and wherein the equation is to be used to determine 3D coordinates for other 2D points on the target object.

10. The method of claim 9 comprising using a parametric algorithm that performs a number of iterations to determine the parameters for the perspective projection equation.

11. The method of claim 9 wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters.

12. The method of claim 11 comprising randomly selecting a set of sample pairs from a potential input set of the pairs for each iteration of a plurality of iterations.

13. The method of claim 11 comprising selecting the parameters as final parameters that satisfies the highest number of other 2D-3D pairs.

14. The method of claim 1 wherein the curved objects are at least partially cylindrical;
    wherein the reference image initially includes 2D image data and the three-dimensional coordinates for the reference images in a database are generated without a use of a depth map;
    the method comprising:
        generating the three-dimensional coordinates of the reference objects by using perspective projection from a virtual 3D surface selected to have a shape similar to the shape of the reference object; and
        wherein selecting one or more candidate reference images comprises selecting candidate reference images with reference objects depending on, at least in part, a similarity in feature vectors;
    wherein the pattern is generally either a clockwise circular pattern or counter-clockwise circular pattern;
    the method comprising;
        pairing the 2D points to the 3D points depending on, at least in part, a similarity in feature vectors;
        pairing the 2D points to the 3D points by using a bag of words (BoW) type algorithm to match 2D points to 3D points with the same word;
        using a perspective projection equation to determine the transition parameters between one 2D point on the target object and a paired 3D point on the reference object, and wherein the equation is to be used to determine 3D coordinates for other 2D points on the target object; and
        using a parametric algorithm that performs a number of iterations to determine the parameters for the perspective projection equation;
    wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters;
wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold;
randomly selecting a set of sample pairs from a potential input set of the pairs for each iteration of a plurality of iterations; and
selecting the parameters as final parameters that satisfies the highest number of other 2D-3D pairs.

15. A computer-implemented system comprising:
at least one display;
at least one memory to receive reference image data and query image data;
at least one processor communicatively coupled to the at least one memory and at least one display; and
a curved object recognition unit operated by the at least one processor and to:
obtain image data of at least one reference image having at least one curved reference object, wherein the obtained image data of at least one reference image is from a plurality of reference images each with at least one reference object, and wherein the obtained image data comprises at least three-dimensional coordinates of three-dimensional (3D) points on the at least one curved reference object;
obtain two-dimensional (2D) image data of a curved target object in a query image;
select one or more candidate reference images from the plurality of reference images to pair the 3D points of the reference objects of the candidate reference images to the 2D points of the target object of the query image, wherein selecting one or more candidate reference images comprises selecting candidate reference images with reference objects having at least some of the same words from a bag of words (BoW) type algorithm and generally in the same pattern as the words and pattern on the target object;
match the target object to at least one of the reference objects comprising pairing at least one 2D point from the target object with a corresponding 3D point on at least one of the reference objects as a portion of performing object recognition; and
use the paired 2D-3D point to form a perspective projection function to determine a geometric correspondence between the target object and reference object and that converts the 2D points into 3D points at the target object.

16. The system of claim 15 comprising pairing the 2D points to the 3D points by using a bag of words (BoW) type algorithm to match 2D points to 3D points with the same word.

17. The system of claim 15 comprising using a perspective projection equation to determine the transition parameters between one 2D point on the target object and a paired 3D point on the reference object and to be used to determine 3D coordinates for other 2D points on the target object; and using a parametric algorithm that performs a number of iterations to determine the parameters for the perspective projection equation.

18. The system of claim 17 wherein each pairing of a 2D point to a 3D point is a 2D-3D pair, and wherein using the perspective projection equation comprises entering a sample 2D-3D pair into the equation to compute the parameters, and using the computed parameters in the equation to determine how many other 2D-3D pairs are satisfied with the parameters.

19. The system of claim 18 wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold.

20. The system of claim 15 wherein the curved objects are at least partially cylindrical;
wherein the reference image initially includes 2D image data and the three-dimensional coordinates for the reference images in a database are generated without a use of a depth map;
the curved object recognition unit to:
generate the three-dimensional coordinates of the reference objects by using perspective projection from a virtual 3D surface selected to have a shape similar to the shape of the reference object; and
wherein select one or more candidate reference images comprises selecting candidate reference images with reference objects having at least some of the same words from a bag of words (BoW) type algorithm and generally in the same pattern of words as a pattern of words on the target object, and wherein the pattern is generally either a clockwise circular pattern or counter-clockwise circular pattern;
the curved object recognition unit to:
pair the 2D points to the 3D points depending on, at least in part, a similarity in feature vectors;
pair the 2D points to the 3D points by using a bag of words (BoW) type algorithm to match 2D points to 3D points with the same word;
use a perspective projection equation to determine the transition parameters between one 2D point on the target object and a paired 3D point on the reference object, and wherein the equation is to be used to determine 3D coordinates for other 2D points on the target object; and
use a parametric algorithm that performs a number of iterations to determine the parameters for the perspective projection equation;
wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters;
wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold;
randomly select a set of sample pairs from a potential input set of the pairs for each iteration of a plurality of iterations; and
select the parameters as final parameters that satisfies the highest number of other 2D-3D pairs.

21. A non-transitory computer-readable medium having stored thereon instructions that when executed cause a computing device to:

obtain image data of at least one reference image having at least one curved reference object, wherein the obtained image data of at least one reference image is from a plurality of reference images each with at least one reference object, and wherein the obtained image data comprises at least three-dimensional coordinates of three-dimensional (3D) points on the at least one curved reference object;

obtain two-dimensional (2D) image data of a curved target object in a query image;

select one or more candidate reference images from the plurality of reference images to pair the 3D points of the reference objects of the candidate reference images to the 2D points of the target object of the query image, wherein selecting one or more candidate reference images comprises selecting candidate reference images with reference objects having at least some of the same words from a bag of words (BoW) type algorithm and generally in the same pattern as the words and pattern on the target object;

match the target object to at least one of the reference objects comprising pairing at least one 2D point from the target object with a corresponding 3D point on at least one of the reference objects as a portion of performing object recognition; and use the paired 2D-3D point to form a perspective projection function to determine a geometric correspondence between the target object and reference object and that converts the 2D points into 3D points at the target object.

22. The non-transitory computer-readable medium of claim 21 wherein the computing device is to:

wherein the curved objects are at least partially cylindrical;

wherein the reference image initially includes 2D image data and the three-dimensional coordinates for the reference images in a database are generated without a use of a depth map;

the computing device to:
generate the three-dimensional coordinates of the reference objects by using perspective projection from a virtual 3D surface selected to have a shape similar to the shape of the reference object; and wherein selecting one or more candidate reference images comprises selecting candidate reference images with reference objects depending on, at least in part, a similarity in feature vectors;

wherein the pattern is generally either a clockwise circular pattern or counter-clockwise circular pattern;

the computing device to:
pair the 2D points to the 3D points depending on, at least in part, a similarity in feature vectors;

pair the 2D points to the 3D points by using a bag of words (BoW) type algorithm to match 2D points to 3D points with the same word;

use a perspective projection equation to determine the transition parameters between one 2D point on the target object and a paired 3D point on the reference object, and wherein the equation is to be used to determine 3D coordinates for other 2D points on the target object; and use a parametric algorithm that performs a number of iterations to determine the parameters for the perspective projection equation;

wherein each pairing of a 2D point to a 3D point is a 2D-3D pair, and wherein using the perspective projection equation comprises entering at least one sample 2D-3D pair into the equation to compute the parameters, and using the computed parameters in the equation to determine how many other 2D-3D pairs are satisfied with the parameters;

wherein an other 2D-3D pair is considered satisfied by the perspective projection equation when inputting coordinates of one of the points in the 2D-3D pair results in computed coordinates that are the same or close to the input set coordinates of the other point in the 2D-3D pair so that the difference between the computed coordinates and input set coordinates is less than a threshold;

randomly select a set of sample pairs from a potential input set of the pairs for each iteration of a plurality of iterations; and select the parameters as final parameters that satisfies the highest number of other 2D-3D pairs.

* * * * *